United States Patent [19]

Hobbs et al.

[11] 3,965,674
[45] June 29, 1976

[54] COMBINED CYCLE ELECTRIC POWER PLANT AND A GAS TURBINE HAVING A BACKUP CONTROL SYSTEM WITH AN IMPROVED FEEDFORWARD ANALOG SPEED/LOAD CONTROL

[75] Inventors: Milton M. Hobbs; Roy Kiscaden, both of Springfield, Pa.

[73] Assignee: Westinghouse Electric Corporation, Pittsburgh, Pa.

[22] Filed: Aug. 8, 1974

(Under Rule 47)

[21] Appl. No.: 495,693

[52] U.S. Cl. .................. 60/39.18 B; 60/39.28 R; 60/39.14
[51] Int. Cl.² .......................................... F02C 7/62
[58] Field of Search .............. 60/39.28 R, 39.28 T, 60/39.18 B; 290/40 A; 415/10, 17

[56] References Cited
UNITED STATES PATENTS

| | | | |
|---|---|---|---|
| 2,971,337 | 2/1961 | Wintrode | 60/39.28 R |
| 3,382,671 | 5/1968 | Ehni | 60/39.28 R |
| 3,421,317 | 1/1969 | Bedford | 60/39.28 R |
| 3,422,800 | 1/1969 | LaHaye | 60/39.28 R |
| 3,469,395 | 9/1969 | Spitsbergen | 60/39.28 R |
| 3,520,133 | 7/1970 | Loft | 60/39.28 R |
| 3,638,422 | 2/1972 | Loft | 60/39.28 R |
| 3,639,076 | 2/1972 | Rowen | 60/39.28 R |
| 3,834,361 | 9/1974 | Keely | 60/39.28 R |

Primary Examiner—Clarence R. Gordon
Attorney, Agent, or Firm—E. F. Possessky

[57] ABSTRACT

A combined cycle electric power plant includes gas and steam turbines and steam generators and a digital-/analog control system. The control system includes a digital automatic control and an analog backup control which are interfaced to control the gas turbine fuel flow for speed and load control purposes. The backup control includes a speed/load control which functions on a feedforward speed control basis without speed feedback correction and on a feedforward load control basis without load feedback correction. The forward speed/load control channel is subjected to high and low limit action and the fuel reference output is applied to a feedback type fuel control, i.e. a throttle valve positioning control. Limit action is also placed on the forward speed/load control channel by a temperature control, a surge control and an overspeed control.

12 Claims, 17 Drawing Figures

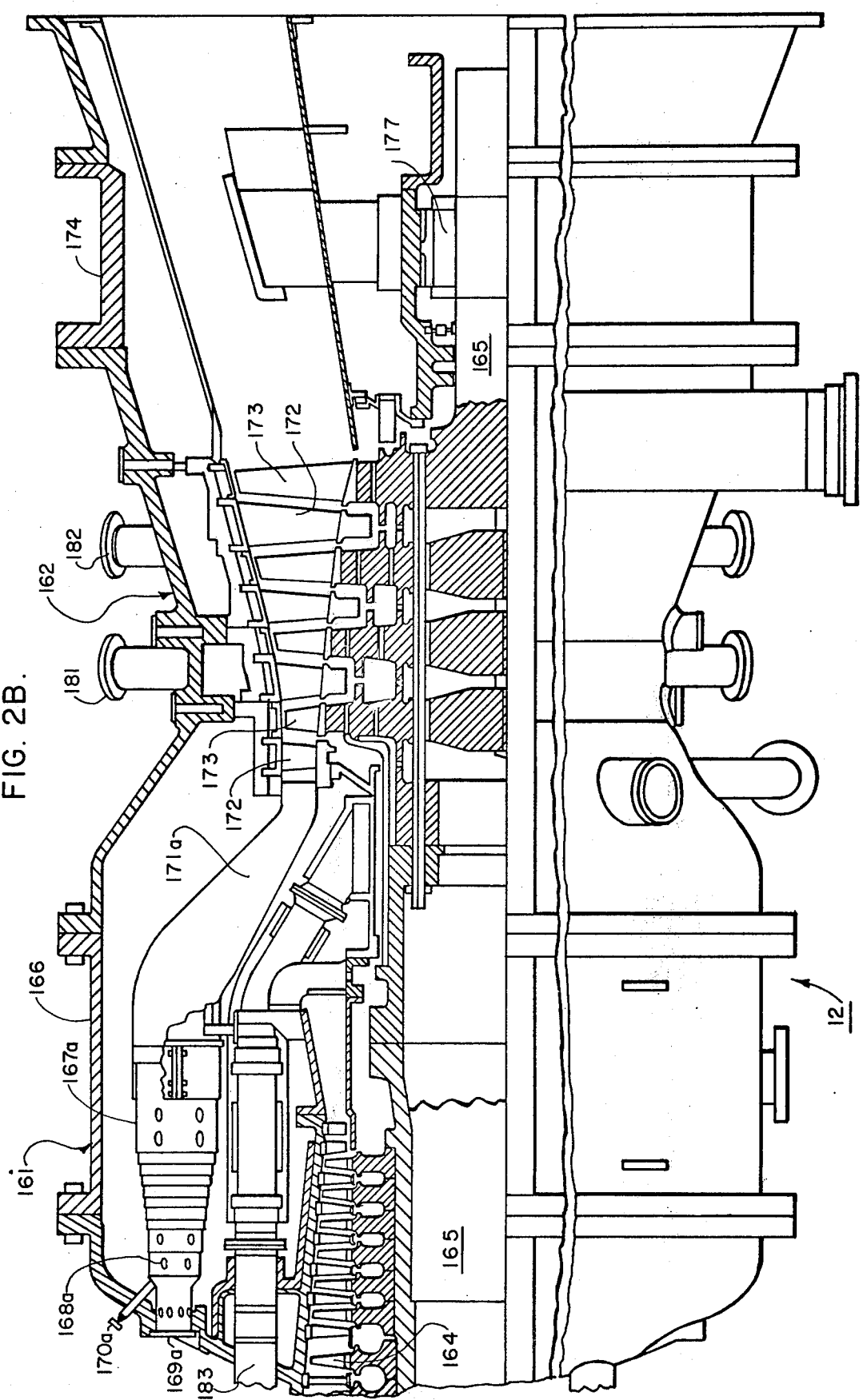

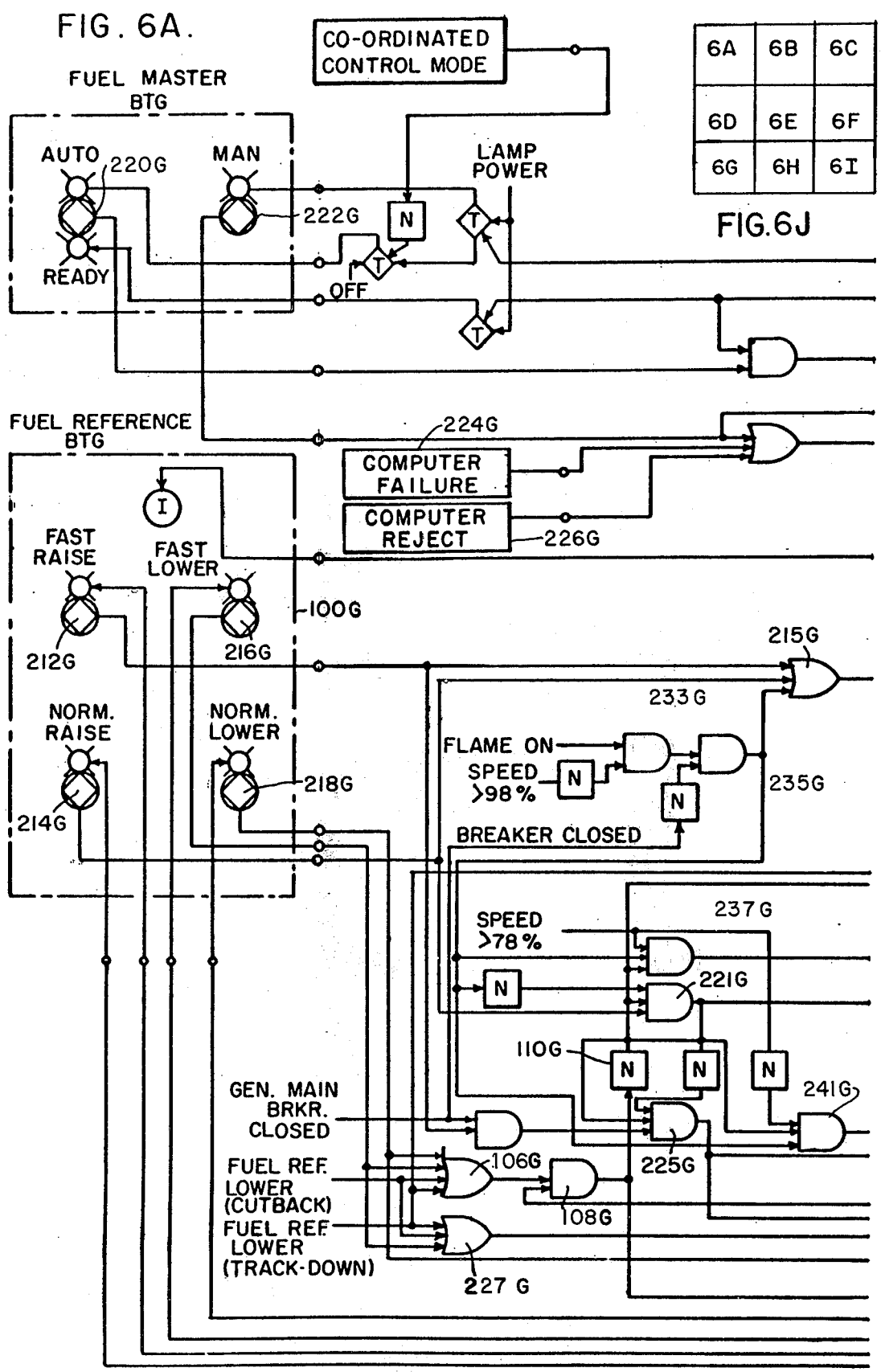

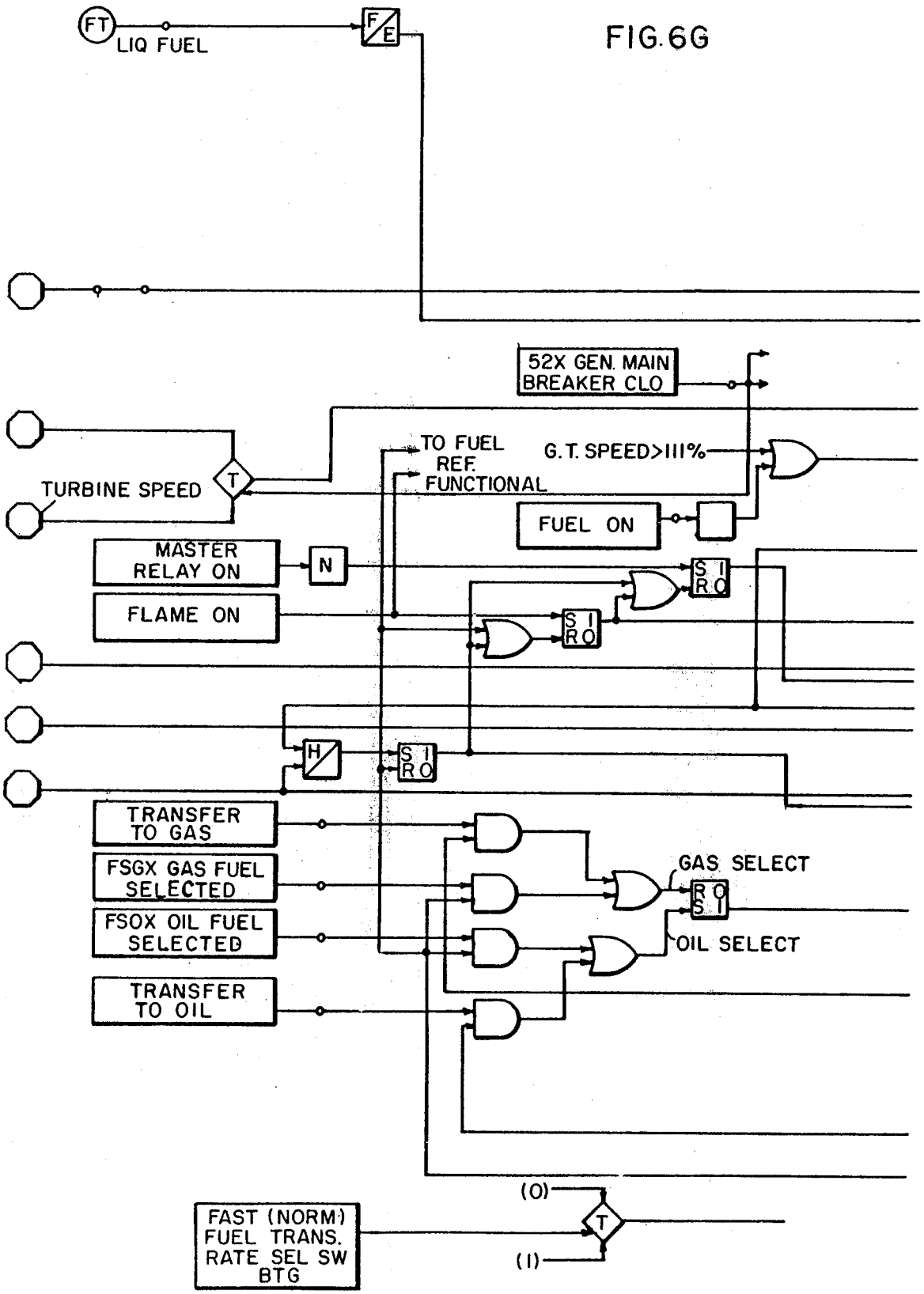

COMBINED CYCLE ELECTRIC POWER PLANT AND A GAS TURBINE HAVING A BACKUP CONTROL SYSTEM WITH AN IMPROVED FEEDFORWARD ANALOG SPEED/LOAD CONTROL

CROSS-REFERENCE TO RELATED APPLICATIONS

Reference is made to the following U.S. Pat. applications:

1. Ser. No. 399,790, filed on Sept. 21, 1973 by L. F. Martz, R.W. Kiscaden and R. Uram, entitled "An Improved Gas Turbine And Steam Turbine Combined Cycle Electric Power Generating Plant Having A Coordinated And Hybridized Control System And An Improved Factory Based Method For Making And Testing Combined Cycle And Other Power Plants And Control Systems Therefor", assigned to the present assignee and hereby incorporated by reference.

2. Ser. No. 319,114, filed by T. Giras and J. Reuther on Dec. 29, 1972 as a continuation of an earlier filed application Ser. No. 082,470, entitled "An Improved System And Method For Operating Industrial Gas Turbine Apparatus And Gas Turbine Electric Power Plants Preferably With A Digital Computer Control System" and assigned to the present assignee, and related cases referred to therein.

3. Ser. No. 371,625, filed on June 20, 1973 by R. Yannone and R. A. Shields, entitled "Gas Turbine Power Plant Control Apparatus Having A Multiple Backup Control System", and assigned to the present assignee, and related cases referred to therein.

4. Ser. No. 495,795, now U.S. Pat. No. 3,898,113 filed concurrently herewith by Lyle F. Martz and Richard J. Plotnick, entitled "Combined Cycle Electric Power Plant Having A Control System Which Enables Dry Steam Generator Operation During Gas Turbine Operation", assigned to the present assignee and hereby incorporated by reference.

BACKGROUND OF THE INVENTION

The present invention relates to combined cycle electric power plants and more particularly to improved gas turbine speed/load controls especially useful in backup controllers in combined cycle electric power plants.

In the operation of combined cycle and other gas turbine plants having an automatic control, it is desirable that a backup control be provided for the primary automatic control so as to improve the operating availability of the electric power generating plant. In a coassigned and copending patent application Ser. No. 476,182 filed by R. Yannone et al on June 4, 1974, there is disclosed a backup control for a digital computer automatic control like that disclosed in the previously referenced copending patent application Ser. No. 319,144.

Generally, in the startup of a gas turbine, it is desirable to control the fuel flow to reach synchronous speed rapidly without exceeding equipment design limits and particularly without exceeding blade path or exhaust temperature limits and without entering a surge condition. After synchronization, the fuel flow is controlled to generate demand load where load control is provided or to generate a resulting load where blade path or exhaust temperature limit control is employed.

In startup and load control, it is desirable that backup/primary control transfers be made bumplessly. Further, it is desirable that the backup control be economic yet reliable and sufficiently functional to provide the operator with safe and flexible control over the turbine and the power generating plant either on selection of the backup control mode or on automatic rejection to the backup control mode. In combined cycle plants, it is especially desirable that gas turbine availability be high and that backup control be reliable because of the dependence of the plant on the gas turbine heat supply.

Loft U.S. Pat. No. 3,520,133 shows a feedforward startup control as part of an automatic control of the analog electropneumatic type. The aforementioned Ser. No. 319,114 employs feedforward speed reference generation for a speed feedback control loop in a digital-/analog hybrid gas turbine control. In the related steam turbine art, feedforward control has been employed in the forward generation of throttle valve position references as in Eggenberger U.S. Pat. No. 3,097,488 and the forward generation of throttle and governor valve position references as in a copending and coassigned patent application Ser. No. 319,115 entitled "Improved System And Method For Operating A Steam Turbine And An Electric Power Generating Plant" filed by T. Giras et al on Dec. 29, 1972 as a continuation of earlier filed applications, and another copending and coassigned U.S. Pat. application Ser. No. 408,962 entitled "Improved System And Method For Starting, Synchronizing And Operating A Steam Turbine With Digital Computer Control" and filed as a continuation of an earlier filed application by T. Giras et al on Oct. 23, 1973. However, there is no known prior disclosure of the application of feedforward control principles in the provision of reliable, safe, flexible and multi-functional backup control for combined cycle and other gas turbine electric power plants.

The description of prior art herein is made on good faith and no representation is made that any prior art considered is the best pertaining prior art nor that the interpretation placed on its is unrebuttable.

SUMMARY OF THE INVENTION

A gas turbine or combined cycle electric power plant includes turbine and generator apparatus and a control system having an automatic primary control and a backup control which are coupled to a turbine valve control to control the fuel flow and the gas turbine operating level. The backup control includes a feedforward speed/load control which provides flexible and reliable backup gas turbine and combined cycle plant operation preferably subject to blade path or exhaust temperature, overspeed and surge limit control action.

BRIEF DESCRIPTION OF THE DRAWINGS

FIGS. 2A and 2B illustrate a gas turbine structure which can be employed in the plant of FIG. 1;

FIGS. 6A through 6I show a more detailed functional diagram of the backup control and other elements of the control system and FIG. 6J shows how these Figures are tied together.

DESCRIPTION OF THE PREFERRED EMBODIMENT

A. General Plant Description

Figure 1:
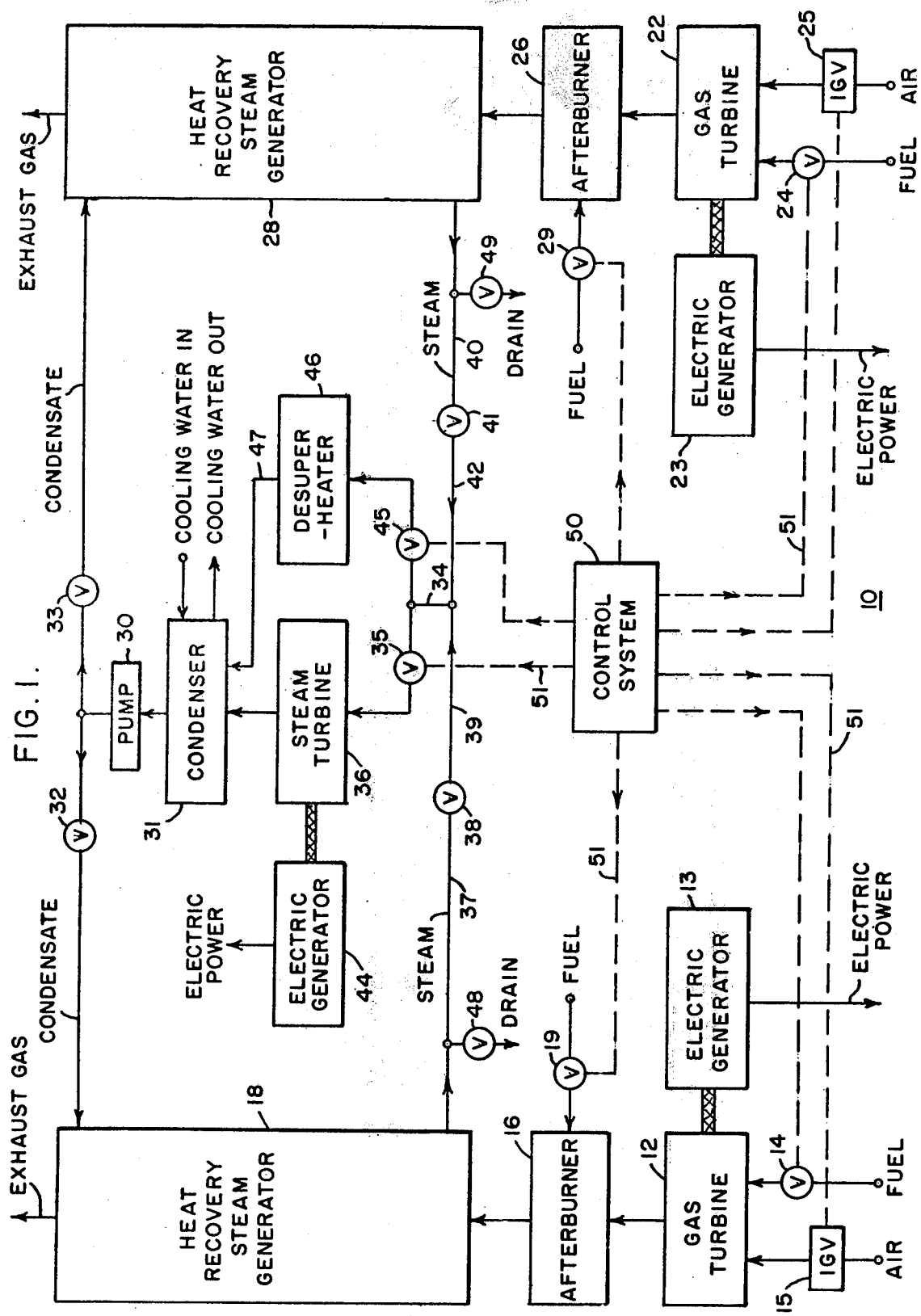
FIG. 1 shows a schematic view of a combined cycle electric power plant in which there is employed a gas turbine in accordance with the principles of the invention.

Referring to FIG. 1 of the drawings, there is shown a functional block diagram of a representative embodiment of a combined cycle electric power generating plant constructed in accordance with the present invention. Reference numeral 10 is used to identify the combined cycle plant as a whole. As such, the plant 10 includes a first gas turbine 12 (sometimes referred to as "gas turbine No. 1") which drives a first electric generator 13. Fuel is supplied to the gas turbine 12 by way of a fuel control valve or throttle valve 14. Air enters the gas turbine 12 by way of a variable inlet guide vane mechanism 15 which controls the degree of opening of the turbine air intake and which is used to adjust air flow during the startup phase and to increase part load efficiency. The fuel supplied by the throttle valve 14 is burned in the gas turbine 12 and the resulting high temperature exhaust gas is passed through an afterburner 16 and a heat recovery steam generator 18 and is thereafter exhausted into the atmosphere.

Heat recovery recovery steam generator 18 (sometimes referred to as "heat recovery steam generator No. 1") includes therein various sets of boiler tubes which are heated to a relatively high temperature by the gas turbine exhaust gas passing through the steam generator 18. Afterburner 16 includes a burner mechanism for further increasing the temperature of the gas turbine exhaust gas before it enters the steam generator 18. Fuel is supplied to the burner mechanism in the afterburner 16 by way of a fuel control valve or throttle valve 19. The primary heat source for the steam generator 18 is the gas turbine 12, the afterburner 16 being in the nature of a supplemental heat source for providing supplemental heat when needed. In terms of typical fuel usage, approximately 80% of the fuel is used in the gas turbine 12 and 20% is used in the afterburner 16.

The combined cycle plant 10 further includes a second gas turbine 22 (sometimes referred to as "gas turbine No. 2") which drives a second electric generator 23. Fuel is supplied to the gas turbine 22 by way of a fuel control valve or throttle valve 24. Air enters the gas turbine 22 by way of a variable inlet guide vane mechanism 25 which is used to adjust air flow during turbine startup and to increase part load efficiency. The fuel supplied by throttle valve 24 is burned in the gas turbine 22 and the resulting high temperature exhaust gas is passed through an afterburner 26 and a heat recovery steam generator 28 and is thereafter exhausted into the atmosphere.

Heat recovery steam generator 28 (sometimes referred to as "heat recovery steam generator No. 2") includes various sets of boiler tubes which are heated to a relatively high temperature by the gas turbine exhaust gas passing through the steam generator 28. Afterburner 26 includes a burner mechanism for further increasing the temperature of the gas turbine exhaust gas before it enters the steam generator 28. Fuel is supplied to the burner mechanism in the after-burner 26 by way of a fuel control valve or throttle valve 29. The primary heat source for the steam generator 28 is the gas turbine 22, the after burner 26 being in the nature of a supplemental heat source for providing supplemental heating when needed. In terms of typical total fuel consumption, approximately 80% of the fuel is used in the gas turbine 22 and 20% is used in the afterburner 26.

A condensate pump 30 pumps water or condensate from a steam condenser 31 to both of the steam generators 18 and 28, the condensate flowing to the first steam generator 18 by way of a condensate flow control valve 32 and to the second steam generator 28 by way of a condensate flow control valve 33. Such condensate flows through the boiler tubes in each of the steam generators 18 and 28 and is converted into superheated steam. The superheated steam from both of the steam generators 18 and 28 is supplied by way of a common header or steam pipe 34 and a steam throttle valve or control valve 35 to a steam turbine 36 for purposes of driving such steam turbine 36. The steam from the first steam generator 18 flows to the header 34 by way of a steam pipe 37, an isolation valve 38 and a steam pipe 39, while steam from the second steam generator 28 flows to the header 34 by way of a steam pipe 40, an isolation valve 41 and a steam pipe 42.

The spent steam leaving steam turbine 36 is passed to the condenser 31 wherein it is condensed or converted back into condensate. Such condensate is thereafter pumped back into the steam generators 18 and 28 to make more steam. Steam turbine 36 drives a third electric generator 44.

A steam bypass path is provided for use at appropriate times for diverting desired amounts of steam around the steam turbine 36. This steam bypass path includes a steam turbine bypass valve 45 and a desuperheater 46, the output side of the latter being connected to the condenser 31 by way of a pipe 47. A drain valve 48 is provided for the first steam generator 18, while a drain valve 49 is provided for the second steam generator 28.

The operation of the combined cycle electric power generator plant 10 is controlled by a control system 50, typical control signal lines 51 being shown in a broken line manner. As will be seen, the control system 50 offers a choice of four different control operating levels providing four different degrees of automation. From highest to lowest in terms of the degree of automation, these control operating levels are: (1) plant coordinated control; (2) operator automatic control; (3) operator analog control; and (4) manual control. The control system 50 includes an analog control system which is constructed to provide complete and safe operation of the total plant 10 or any part thereof. The control system 50 also includes a digital computer that provides a real-time digital control system that works in conjunction with the analog control system at the higher two levels of control to coordinate and direct the operation of the analog control system. Failure of the digital control computer results in no loss of power generation because the analog control system provides for complete operation of the plant 10.

When operating at the highest level of control, namely, at the plant coordinated control level, the control system 50, among other things, automatically coordinates the settings of the fuel valves 14, 19, 24 and 29, the inlet guide vanes 15 and 25 and the steam turbine throttle and bypass valves 35 and 45 to provide maximum plant efficiency under static load conditions and optimum performance during dynamic or changing load conditions.

The control system 50 also enables a coordinated automatic startup or shutdown of the plant 10 such that the plant 10 can be brought from a hot standby condition to a power generating condition or vice versa in a quick, efficient and completely automatic manner. For example, the entire plant 10 can be started and brought to full load from a hot standby condition in approximately 60 minutes time by having the plant operator simply dial in the desired load setting and push a master plant start button.

As an indication of the flexibility and reliability of the power generating plant 10, it is noted that the plant 10 can be operated in any one of the following configurations: (1) using one steam turbine and two gas turbines; (2) using one steam turbine and one gas turbine; (3) using two gas turbines only; and (4) using one gas turbine only. The steam turbine 36 will, of course, not operate by itself, it being necessary to use at least one of the gas turbines 12 and 22 in order to use the steam turbine 36. In order to obtain the benefits of combined cycle operation, it is, of course, necessary to use the steam turbine 36 and at least one of the gas turbines 12 and 22. When one of the gas turbines, for example the gas turbine 12, is not being used or is shut down for maintenance purposes, then its associated steam generator 18 can be removed from the system by closing its condensate flow valve 32 and its steam isolation valve 38. When, on the other hand, the steam turbine 36 is not being used or is shut down for maintenance purposes, the steam generated by the steam generators 18 and 28 can be bypassed to the condenser 31 by way of steam bypass valve 45 and the desuperheater 46. As an alternative, when the steam turbine 36 is not being used, either one or both of the steam generators 18 and 28 can be drained and vented by the appropriate setting of condensate valves 32 and 33, steam isolation valves 38 and 41 and drain valves 48 and 49. In other words, each of the steam generators 18 and 28 is constructed so that its respective gas turbine can be operated with the steam generator in a dry condition.

The combined cycle plant 10 affords a high degree of reliability in that failure of any one of the major apparatus components will not reduce total plant power generation capacity by more than 50%. In this regard and by way of example only, a combined cycle plant 10 has been developed having a nominal maximum power generating capacity of 260 megawatts. In such plant, each of the gas turbines 12 and 22 is capable of producing a maximum of approximately 80 megawatts of electrical power under ISO conditions (59° Fahrenheit at sea level) and the steam turbine 36 is capable of producing a maximum of approximately 100 megawatts of electrical power. Thus, loss of any one of the turbines 12, 22 and 36, for example, would not reduce total plant capacity by as much as 50%.

It is noted in passing that the functional block diagram of FIG. 1 has been simplified in some respects relative to the actual plant apparatus to be described hereinafter, this simplification being made to facilitate an initial overall understanding of the combined cycle plant 10. A major simplification in FIG. 1 concerns the fuel valves 14, 19, 24, and 29. As will be seen in the actual embodiment of the combined cycle plant described herein, provision is made for operating the gas turbines 12 and 22 and the afterburners 16 and 26 on either of two different kinds of fuel, namely, either natural gas or distillate type fuel oil. As a consequence, each of the gas turbines 12 and 22 and each of the afterburners 16 and 26 is actually provided with two fuel throttle valves, one for natural gas and the other for fuel oil. Also, various other valves and devices employed in the actual fuel supply systems have been omitted from FIG. 1 for the sake of simplicity. Other simplifications employed in FIG. 1 are of a similar character.

B. Gas Turbine Mechanical Structure

Figure 2A:
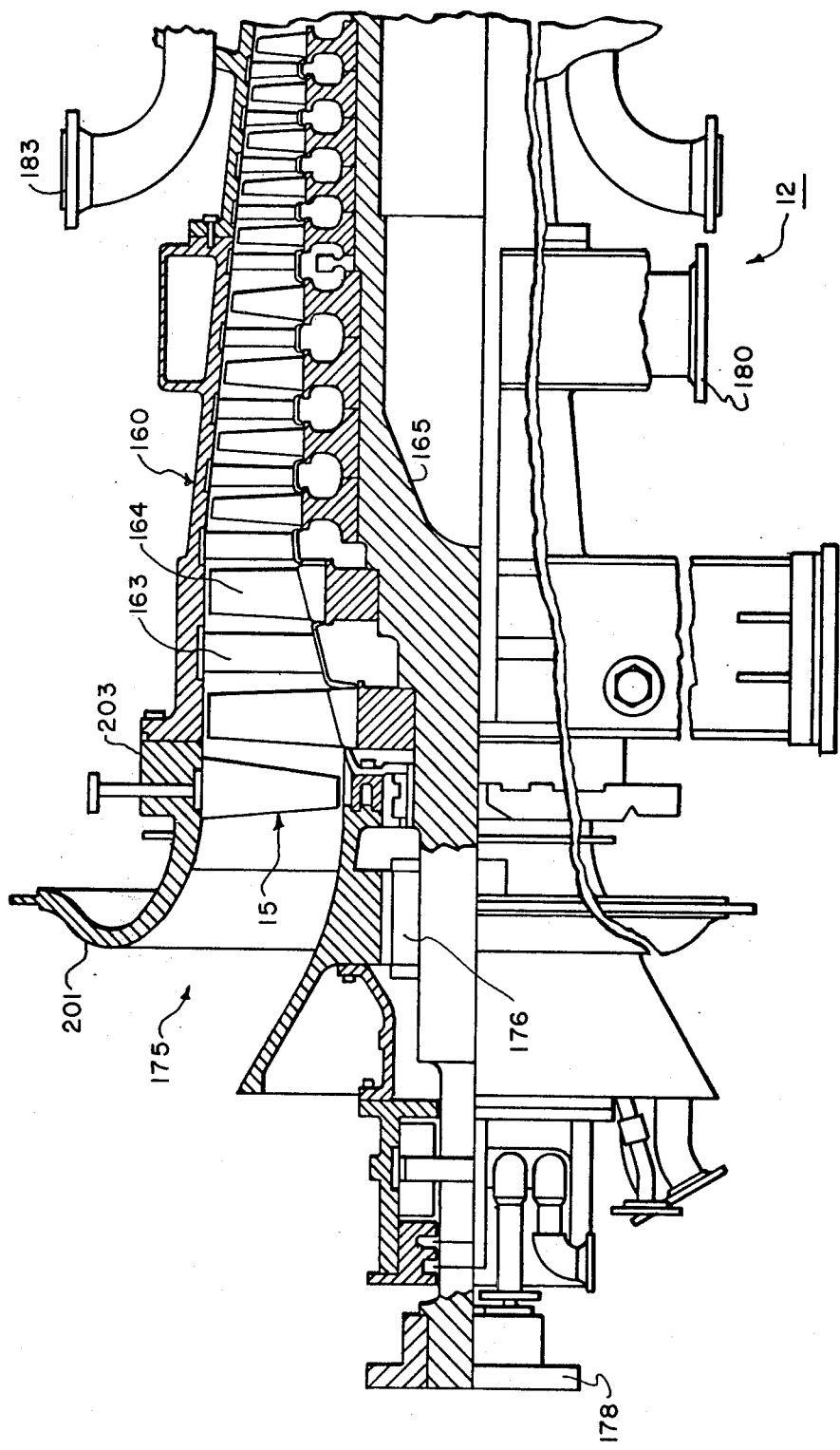

Referring now to FIGS. 2A and 2b, there is shown a longitudinal, partially cross-sectional, elevational view of the No. 1 gas turbine 12. FIG. 2A shows the left-hand half of the view and FIG. 2B shows the right-hand half of the view. The No. 2 gas turbine 22 is of this same construction and whatever is said concerning the construction of the No. 1 gas turbine 12 also applies to the No. 2 gas turbine 22. With this in mind, the gas turbine 12 is a W-501 gas turbine manufactured by Westinghouse Electric Corporation, Gas Turbine Systems Division, Lester, Pennsylvania. It is of the simple open cycle type and employs a single-shaft two-bearing construction in which no bearings are located in a high pressure, high temperature zone. It is constructed for operation at a rated speed of 3,600 rpm and is capable of driving an electric generator for producing in excess of 80 megawatts of electrical power. It includes an axial flow air compressor section 160, a combustion section 161 and a turbine section 162. The compressor section or compressor 160 is comprised of interspersed sets of stationary blades 163 and rotary blades 164, the latter being located on a rotor structure 165 which extends substantially the entire length of the gas turbine 12.

The combustion section 161 includes a combustor housing or combustor shell 166 which receives the compressed air from the compressor 160. Located in the combustor shell 166 is a set of 16 combustion chambers or combustors, one of which is indicated at 167a. These combustors 167a–167p are arranged in an evenly spaced concentric manner around the longitudinal center axis of the gas turbine 12. Considering in detail only the combustor 167a, compressed air enters the interior thereof by multiple ports 168a. Fuel enters the combustor 167a by way of a fuel nozzle 169a, a spark plug 170a serving to provide for the initial ignition of the fuel. This fuel is burned in the combustor 167a and the resulting high temperature, high pressure gas is supplied by way of a combustor outlet duct 171a to the inlet of the turbine section 162.

The turbine section 162 is a four stage turbine having interspersed sets of stationary blades 172 and rotary blades 173, the latter being located on the rotor structure 165. The high temperature high pressure gas from all of the combustors 167a–167p enters the turbine section 162 and expands through the turbine blades 172 and 173 to cause rotation of the rotary blades 173 and thereby drive the rotary blades 164 of the compressor 160 on the same rotor structure 165. The hot exhaust gas leaving the turbine section 162 exhausts axially by way of an exhaust duct 174 from whence it flows into the inlet duct for the heat recovery steam generator 18.

The variable inlet guide vane mechanism 15 is located just inside the air intake structure 175 of the compressor section 160, just ahead of the first set of compressor blades 163 and 164. The inlet guide vanes 15 are used to adjust the compressor air flow during the starting cycle and to increase part load efficiency.

The two bearings which support the single rotor structure 165 of the gas turbine 12 are indicated at 176 and 177. As seen, these bearings 176 and 177 are located outside of any high pressure high temperature zone. The electric generator 13 is coupled to the cold or compressor end 178 of the rotor structure 165 to avoid potential misalignment problems. Some air is removed from the compressor 160 by way of outlet 180, externally cooled and filtered by an air cooler and returned to the turbine section 162 to cool the first two sets of stationary blades 172 and the first set of rotary blades 173. The cooling air for the stationary blades 172 enters through inlets 181 and 182, while the cooling air for the first set of rotary blades 173 enters via inlet 183.

For more detail on the structure of other apparatus in the plant 10, reference is made to Ser. No. 495,765.

C. Plant Control System

The plant control system 50 is organized to operate the plant equipment safely through startup and loading with high reliability so that the plant is highly and quickly available to meet power demanded from it. To achieve this purpose, the plant control system is preferably embodied in digital/analog hybrid form, and the digital/analog interface is preferably disposed in a way that plant protection and plant availability are enhanced.

Generally, the total plant power is controlled by controlling the operating level of the turbines and the afterburners, but the steam turbine goes into a follow mode of operation once the steam bypass valves are closed and the steam turbine inlet valves are fully opened. In the follow mode, the steam turbine produces power at a level dependent on the steam conditions generated by the heat inputs to the steam generators.

Figure 3:
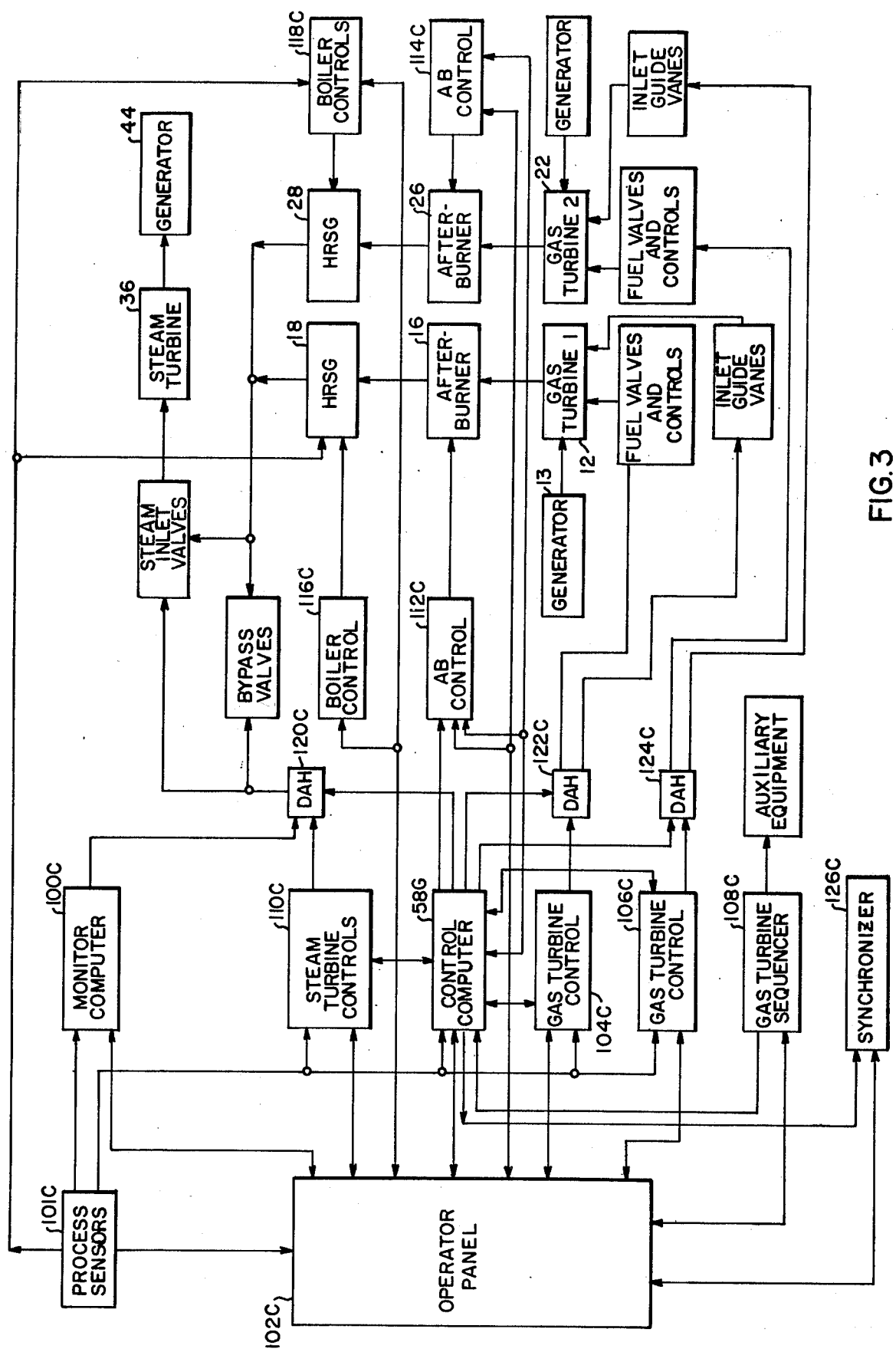
FIG. 3 shows a schematic view of a control system arranged to operate the plant of FIG. 1 in accordance with the principles of the invention.

As shown in FIG. 3, the control system 50 includes a digital control computer 58G, a digital monitor computer 100C and various analog controls for operating the plant equipment in response to process sensors 101C while achieving the described objectives. In this instance an automatic startup control for the steam turbine 36 is largely embodied in the monitor computer 100C. An operator panel 102C provides numerous pushbutton switches and various displays which make it possible for the plant to be operated by a single person. The pushbutton switches provide for numerous operator control actions including plant and turbine mode selections and setpoint selections.

In the operator analog or manual mode of operation, the operator sets the fuel level for the gas turbines 12 and 22 and the afterburners 16 and 26 through gas turbine controls 104C and 106C during loading, but an analog startup control included in each of the gas turbine controls 104C and 106C automaticlly schedules fuel during gas turbine startups. In addition, sequencers 108C start and stop auxiliary equipment associated with the gas turbines during gas turbine startups. The turbine bypass steam flow and the turbine inlet steam flow are controlled by operator valve positioning implemented by a steam turbine control 110C during steam turbine startup and loading in the operator analog mode. Certain automatic control functions are performed for the steam and gas turbines by the controls 104C, 106C and 110c in the operator analog mode.

In the operator automatic mode, the computers 58G and 100C perform various control functions which provide for automatic startup and automatic loading of the gas and steam turbines under the direction of the operator on a turbine-by-turbine basis. Afterburner controls 112C and 114C and boiler controls 116C and 118C operate under operator setpoint control during the operator analog and operator automatic modes. Respective digital/analog hybrid circuits 120C, 122C and 124C interface the digital and analog controls.

Under plant coordinated control, the computer 58G generally directs the plant operation through startup, synchronization and loading to produce the plant power demand. The extent of coordinated plant control is dependent on the existing plant configuration, i.e., according to the availability of apparatus for operation or for coordinated operation. For example, if a gas turbine is shut down, it is excluded from coordination. Similarly, if the gas turbine has been excluded from coordinated control by the operator, the computer 58G will operate accordingly. In all coordinated control cases, the boiler controls 116C and 118C function separately, i.e., they react automatically to operator setpoints and signals generated by the process sensors 101C to control the steam generators according to plant conditions produced by coordinated turbine and afterburner operations. The computer 58G provides setpoint signals for the afterburners in the coordinated control mode but not in the operator automatic mode. Coordinated control provides the highest available level of plant automation, and the operator automatic and operator analog modes provide progressively less automation. Some parts of the analog controls function in all of the plant modes.

Generator synchronization is performed by a synchronizer 126C under operator control or under computer control in the coordinated mode. Generally, the respective generators are sequenced through synchronization by switching actions applied to the synchronizer inputs and outputs.

Once the plant reaches hot standby and either gas turbine or both gas turbines have been started, the steam turbine can be started when minimum steam supply conditions have been reached. Thereafter, the turbines are accelerated to synchronous speed, the generators are synchronized and the fuel and steam valves are positioned to operate the turbines at the demand load levels. The manner in which the control system 50 is configured and the manner in which it functions throughout startup and loading depends on the selected plant mode and the selected or forced plant configuration and the real time process behavior.

D. Backup Control System With Feedforward Speed/Load Control

Figure 4:
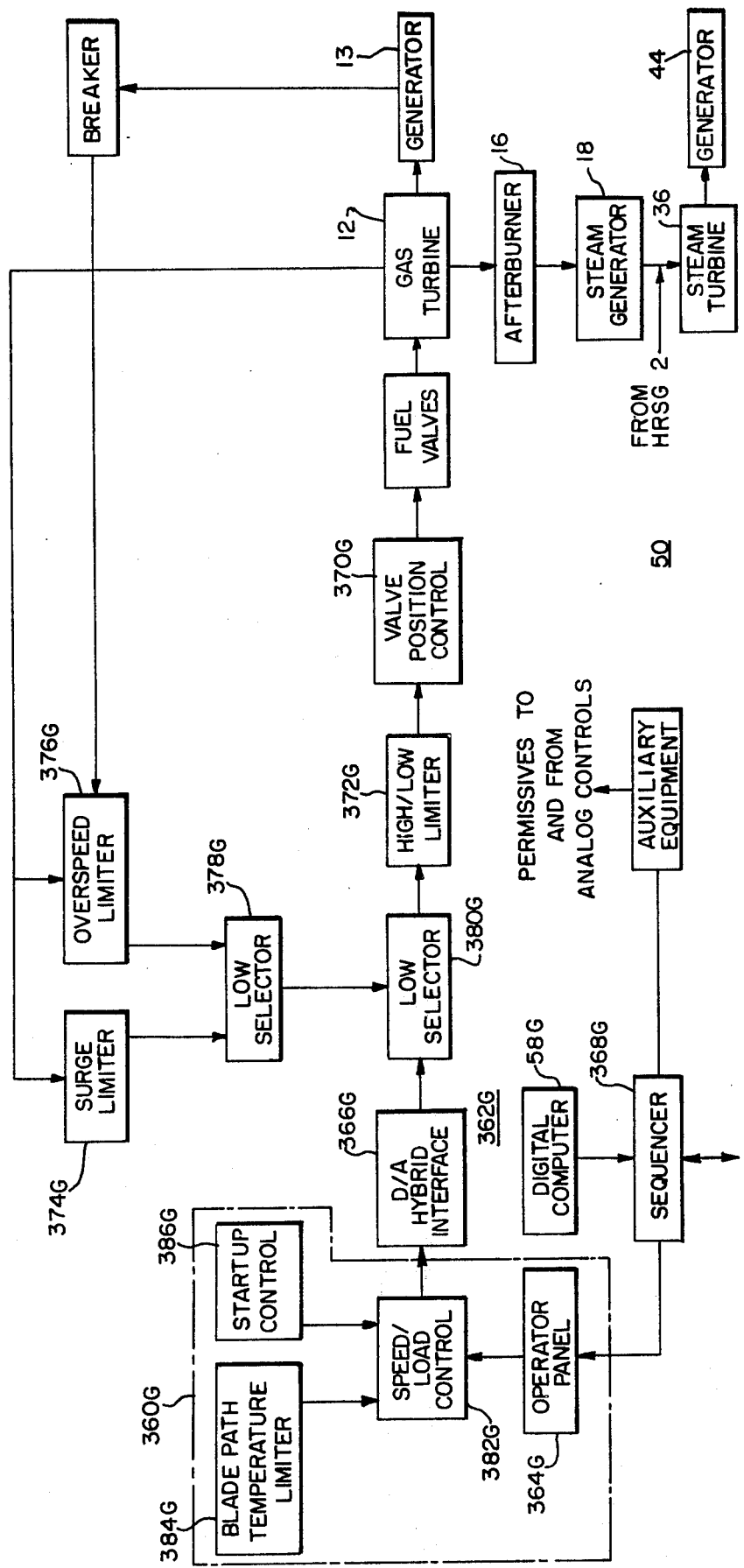
FIG. 4 shows a schematic diagram of the plant control system with elements of a backup control illustrated to indicate more particularly the preferred manner of embodying the invention.

As shown in FIG. 4, a backup control indicated by box 360G is preferably included with a programmed digital computer automatic control 362G in the plant control system 50 to provide for turbine and plant operation in the event the operator selects the manual or operator analog mode of operation or in the event the computer 58G rejects to backup control. Transfer to backup control can be transacted any time after ignition during startup or load operation.

The manual/automatic status of the plant control system 50 is fixed by operator selection at an operator panel 364G or by a computer rejection to manual. A digital/analog hybrid interface 366G includes manual-/automatic logic circuitry to detect when the gas turbine 12 is to be on backup control and to make switching operations which implement the applicable control mode.

In automatic control, the digital computer 58G generates a fuel reference when operating in the coordinated and the operator automatic control levels during speed and load control to function as an automatic speed/load controller, and it initiates turbine startup by a sequencing system 368G under coordinated control. Generally, the sequencer 368G sequences the gas turbine 12 through the startup process by starting and stopping auxiliary equipment when sequencing permissives are generated, and it trips the turbine if certain conditions develop. Further, the sequencer 368G generates logicals for the turbine controls, i.e., a master relay on signal, a fuel on signal, a breaker status signal, a fuel select and transfer signal, and a flame on signal.

The digital/analog hybrid interface 366G generates an output fuel demand signal as a valve position reference for a valve position control 370G comprising electropneumatic circuitry which operates a throttle valve included in the fuel supply system for the gas turbine 12. In automatic control, the computer generated fuel demand is based on an automatic startup fuel scheduling program subject to limit action by a computer blade path temperature limit control during startup and further it is based on a computer load control subject to the computer blade path temperature limit control during load operation. A high/low limiter 372G prevents the fuel demand signal from rising to levels which would cause excessive fuel flow and from falling to levels which could cause outfire.

A surge limit control 374G and an overspeed limit control 376G function in all modes of operation directly through the fuel valve positioning control 370G to limit the fuel demand reference for the purpose of avoiding surge operating conditions and turbine overspeed. For more detail on the surge protection system and the overspeed protection system, reference is made to copending and coassigned patent applications Ser. No. 495,739 entitled "A Combined Cycle Electric Power Plant And A Gas Turbine Having An Improved Overspeed Protection System" and filed by J. Smith and T. Reed concurrently herewith, and Ser. No. 495,715 entitled "A Combined Cycle Electric Power Plant And A Gas Turbine Having An Improved Surge Protection System" filed by J. Smith concurrently herewith.

A low select function 378G transmits the lowest of the surge and overspeed protection limit signals as a limit on the fuel demand from the hybrid 366G. Thus, another low select function 380g imposes a limit on the hybrid fuel demand by transmitting the lowest of the low limit signal from the low select function 378G and the hybrid fuel demand to the throttle valve position control 54. Through low selector operation, surge and overspeed limit control action is imposed bumplessly on the fuel control channel.

In the operator analog mode, a speed/load control 382g functions in response to pushbutton increase or decrease signals from the operator panel 364G to generate the fuel demand signal at the output of the hybrid interface 366G. The speed/load control 382G thus functions in the backup mode as a feedforward fuel reference generator without integrator or other controller action like that often employed in feedback type speed/load controls for power plant gas turbines. The feedforward fuel demand from the backup speed/load control 382G is applied substantially directly to the valve position control 370G to provide direct turbine responses proportional to fuel demand changes made by the operator. Accordingly, the plant operator is provided with a good feel for the plant operation. Further, protection system actions are imposed at points in the control circuitry between the operator and the turbine to prevent unsafe operator actions. Preferably, the limit controls are adjusted to produce the limit actions needed for safe turbine operation while permitting the speed/load control 382G to be the controlling element under normal operating conditions in the manual or operator analog mode.

A blade path temperature limit control 384g functions only in the manual or operator analog mode to limit bumplessly the output signal from the speed/load control 382G as required to prevent excessive blade path temperature and in turn excessive turbine inlet gas temperature. For more detail on the preferred blade path temperature protection system, reference is made to a copending and coassigned patent application Ser. No. 495,694 entitled "A Combined Cycle Electric Power Plant And A Gas Turbine Having Improved Exhaust Temperature Limit Control" and filed by J. Smith and T. Reed concurrently herewith.

If the turbine is to be started in the manual or operator analog mode or if the automatic control rejects to manual during the startup mode, the gas turbine startup is smoothly completed by the operation of a startup control 386G which generates a feedforward speed reference function. More disclosure on that subject is set forth in another copending and coassigned patent application Ser. No. 495,700 entitled "A Combined Cycle Electric Power Plant And A Gas Turbine Having An Improved Startup Control Especially Useful In A Backup Control System" filed by J. Smith and T. Reed concurrently herewith.

As a result of the functioning of the feedforward speed/load control 382G in the control system 50, the gas turbine 12 can be safely, reliably and flexibly started and loaded by the operator on operator selection of the manual or operator analog mode or on computer rejection to the backup mode. Direct coupling of the speed/load control 382G to the valve position control 370G with substantially only signal transmittal functions therebetween helps to make this possible. Thus, no controller delays are introduced into the forward control channel functioning by the switching and converting functions provided by the hybrid interface 366G nor by the switching functions provided by the selector 380G and the high/low limiter 372G.

The plant apparatus elements all can function more continuously to have better availability for power generation because the gas turbine can function as a more available heat source and power generator for the plant through the functioning of the control system 50 with the backup control 360G.

SYSTEM FUNCTIONS

Figure 6B:
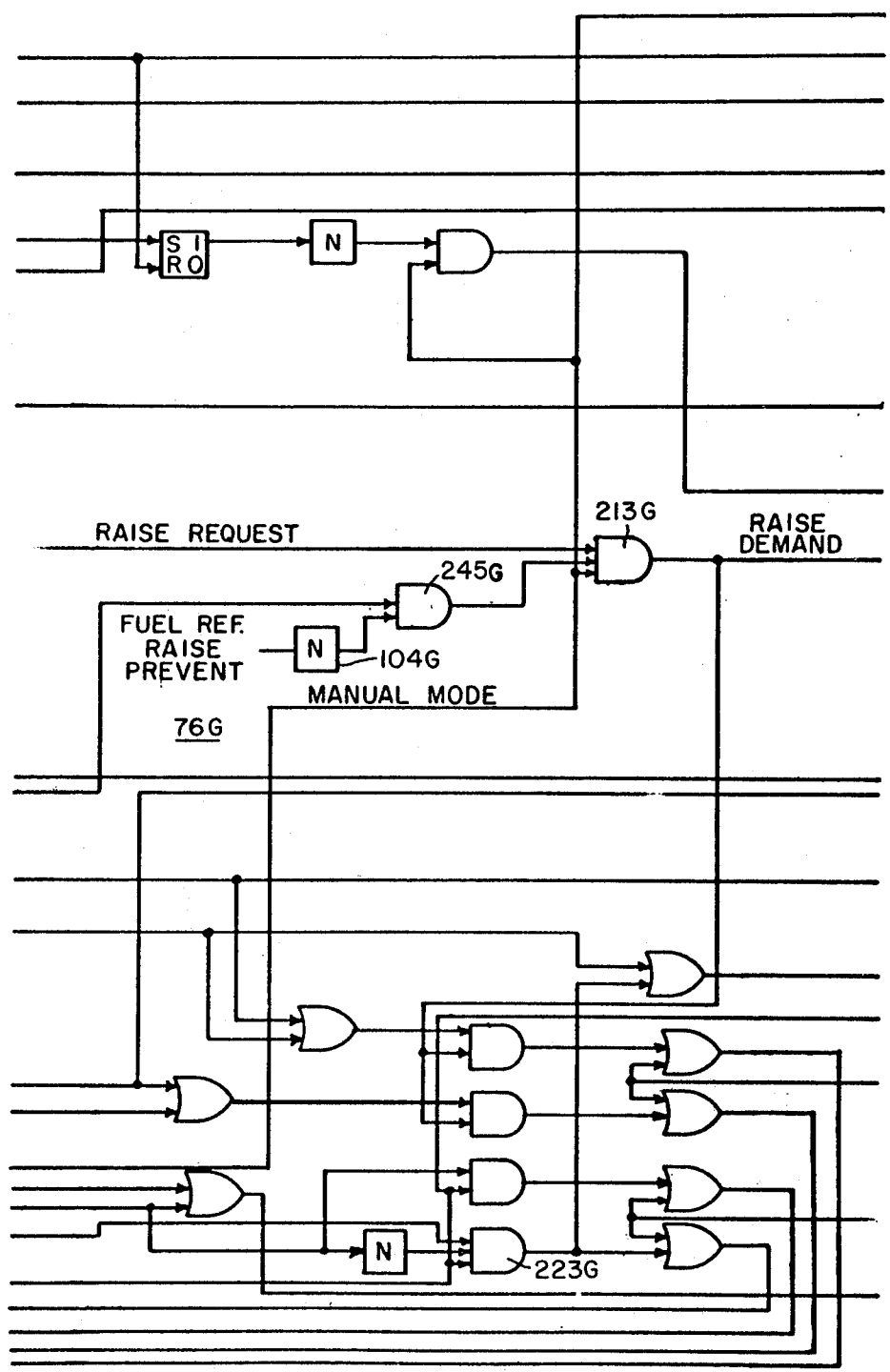
Figure 6C:
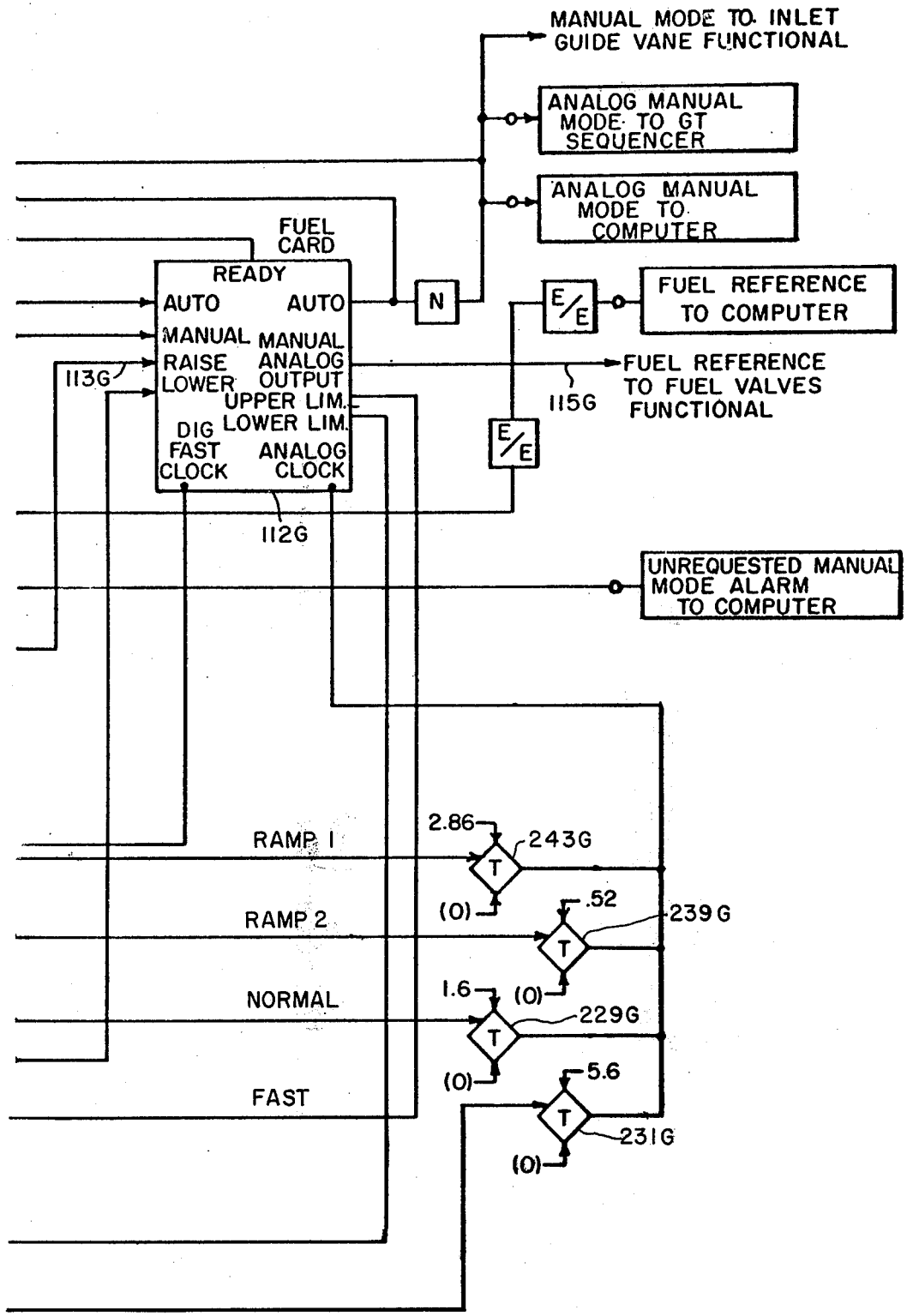

As shown in more functional detail in FIGS. 6A–6C, a fuel reference is generated by the NHC hybrid interface card 112G (FIG. 6C) as indicated by the reference character 115G. Fast and normal raise and lower pushbuttons 212G, 214G, 216G and 218G in box 100G on the operator panel (FIG. 6A) function through RAISE AND and OR blocks 213G and 215G and LOWER AND and OR blocks 108G and 106G to apply inputs to the NHC card 112G which enable the feedforward fuel reference to be raised or lowered in the operator analog or manual mode. The normal raise and lower pushbutton signals are also applied to AND blocks 221G and 223G to set a normal ramp through the application of an analog signal to the NHC clock for as long as the pushbutton is depressed. Similarly, fast raise and lower signals generate a fast ramp through AND block 225G and OR block 227G. Switches 229G and 231G are operated to generate the normal and fast ramp control signals. In the automatic mode, the computer 58G applies signals to the NHC card 112G to generate the output fuel reference from the NHC card 112G.

The automatic mode is selected by a pushbutton 220G if a computer READY signal is received from the NHC card 112G. The system functions in the manual or operator analog mode if a manual pushbutton 222G is pushed or if the computer rejects to manual as indicated by boxes 224G and 226G. Generally, the NHC card 112G responds to the automatic and manual mode signals to interface the manual mode control loops with the automatic mode control loops and to couple these loops with continuously functioning downstream control loops and the downstream fuel valve control.

In the operator analog or manual mode, the output of the NHC card 112G is a fuel demand or reference signal which increases or decreases at the applicable fast or normal rate according to the panel pushbutton operations. The fuel demand signal is a feedforward signal which causes the valve position control 370G to operate the throttle valve and move the gas turbine 12 to the operating level desired by the operator subject only to automatic analog protection control limits. In analog startup, a speed reference ramp function is generated by the startup control 386G subject to pushbutton cutback by the plant operator through the speed/load control 382G.

If the turbine is placed in the startup mode and the backup control is operating, the starting device drives the turbine to ignition speed and, when ignition occurs and the flame is on as indicated by a logical input to AND block 233G, a ramp request is generated by AND block 235G since its breaker status input signal indicates an open breaker and since the turbine speed is less than 98% rated speed at which switchover to synchronization control occurs. The raise request signal is transmitted to the NHC card 112G through the OR raise request block 215G.

The ramp request is also applied to the input of an AND block 237G which sets the clock on the NHC card 112G for generation of the second lower sloped ramp through a switch 239G if the turbine speed is greater than 78% rated. Similarly, an AND block 241G sets the clock on the NHC card 112G for generation of the first higher sloped ramp through a switch 243G if the turbine speed is less than 78% rated.

A signal representing speed being greater than 78% is generated by a monitor block which compares a 78% speed setpoint with a high selected turbine speed feedback signal. The first ramp causes the gas turbine to accelerate automatically in the backup control mode from ignition speed to 78% speed normally free of overtemperature limit control. At the 78% speed point, the second ramp causes the turbine to accelerate to 98% rated speed at a lower acceleration rate normally free of overtemperature limit control. Thereafter, the turbine is in an idle where it can be placed under synchronizer control for generator synchronization. The reasons for this speed schedule are considered more fully in the aforementioned copending and coassigned patent application Ser. No. 495,700.

Figure 6D:
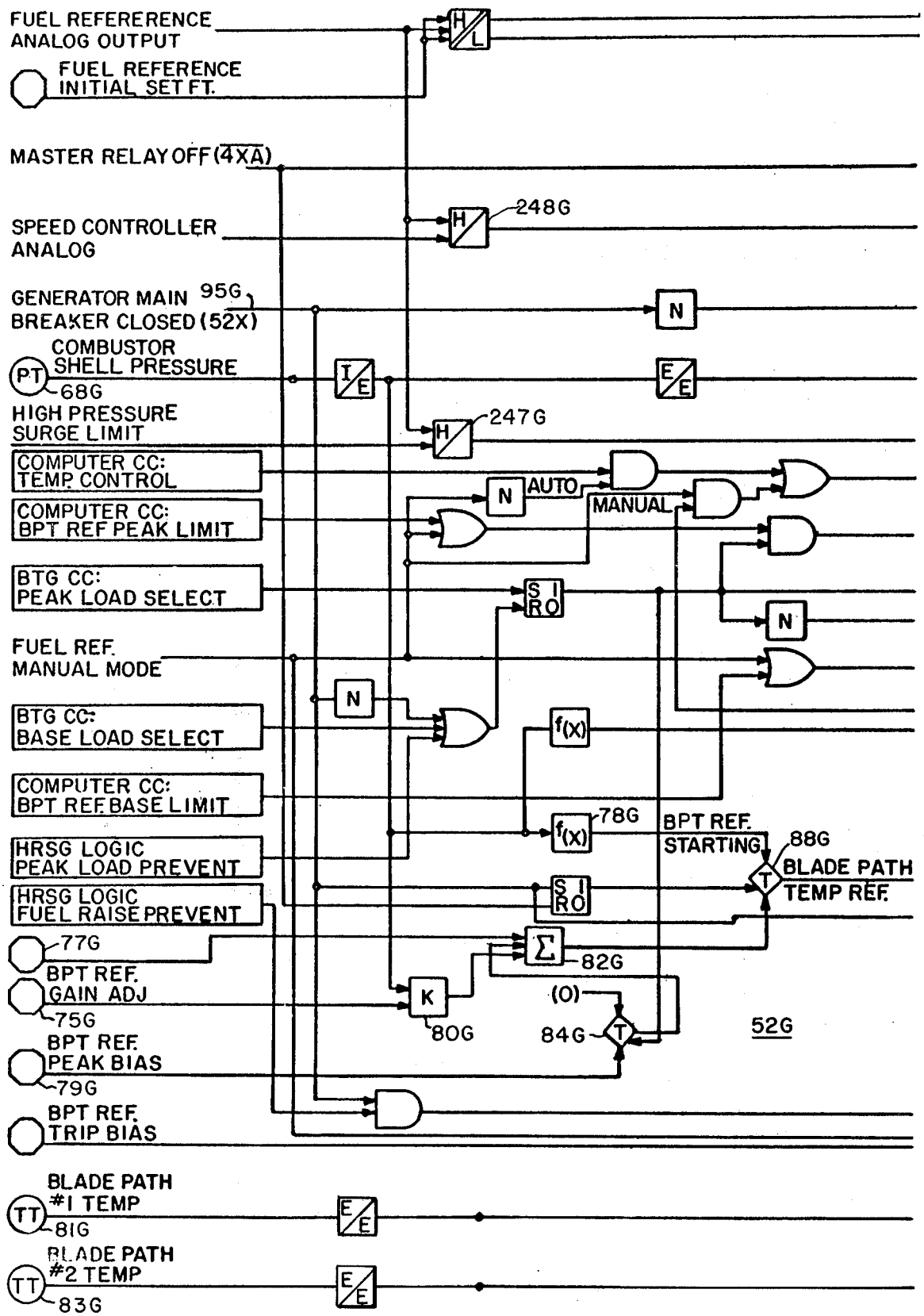
Figure 6E:
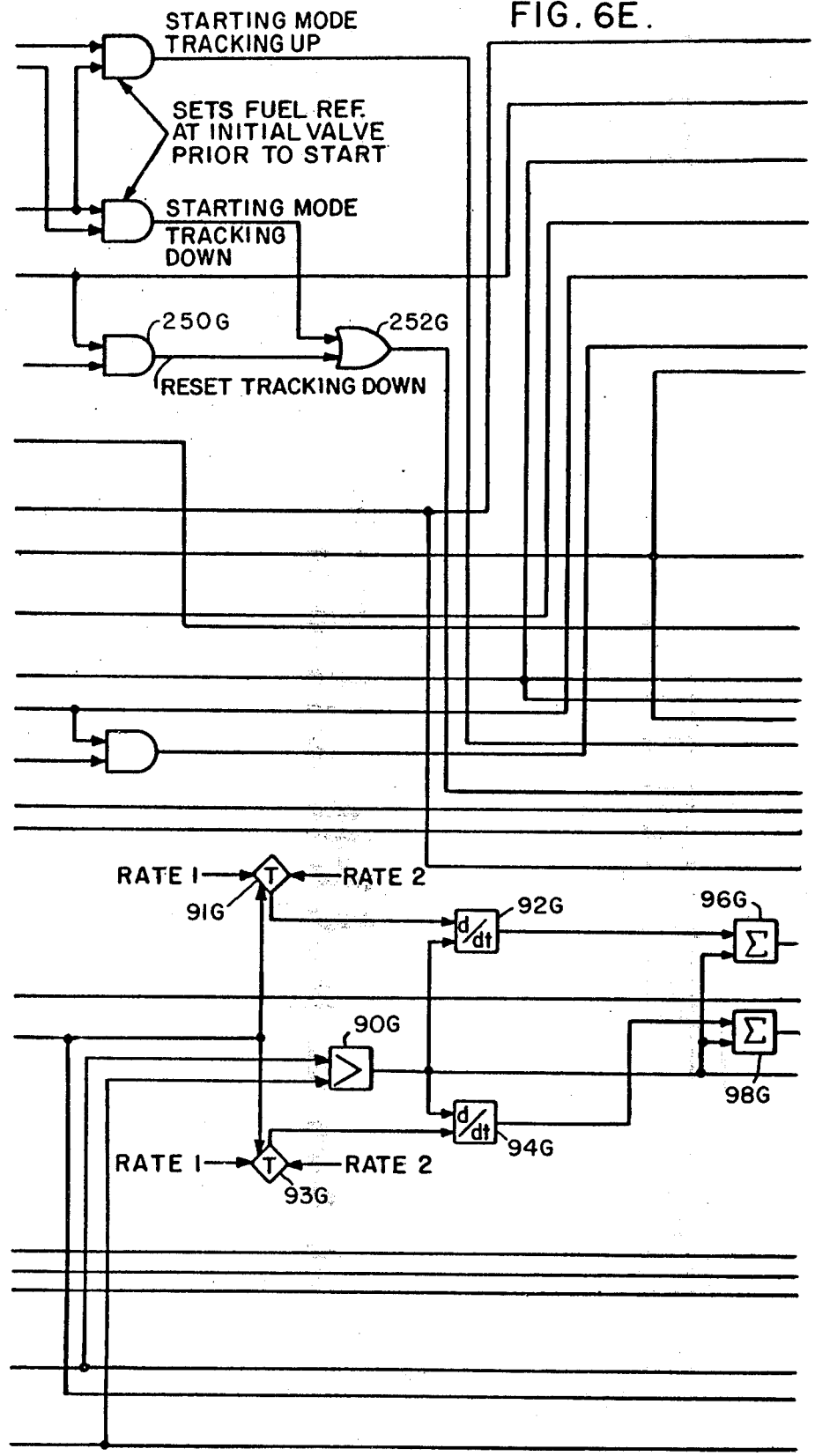
Figure 6F:
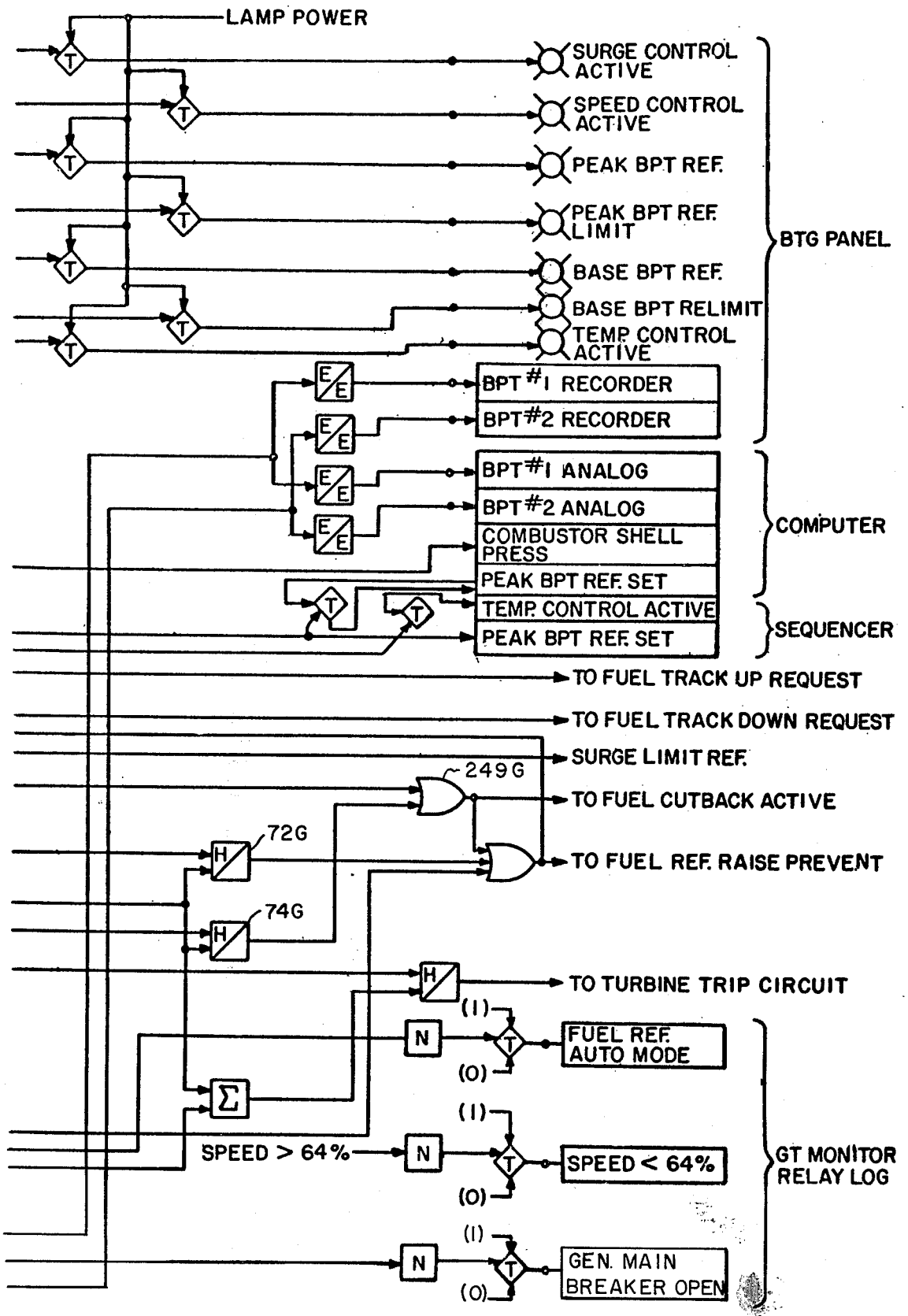
Figure 6H:
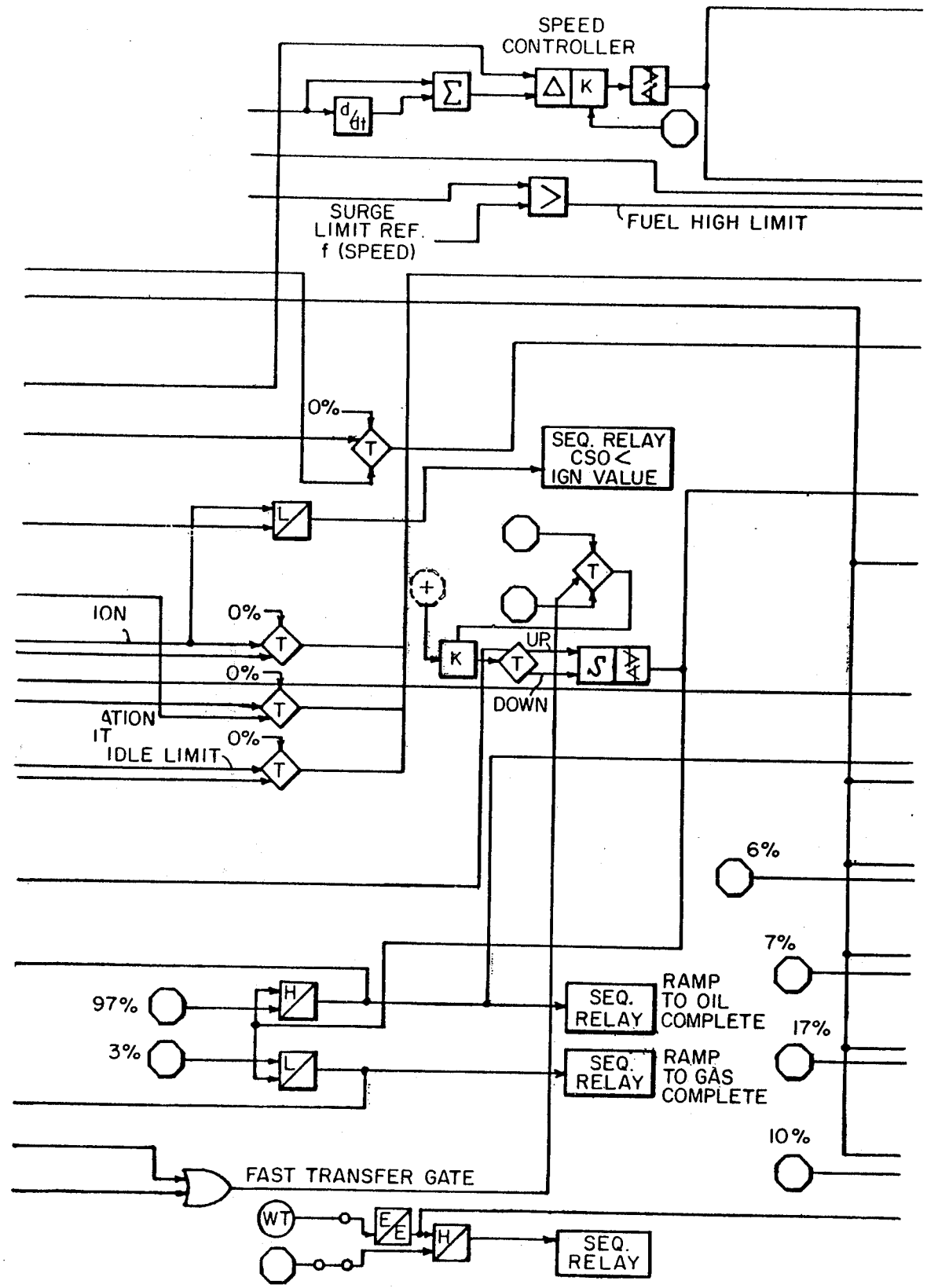
Figure 61:
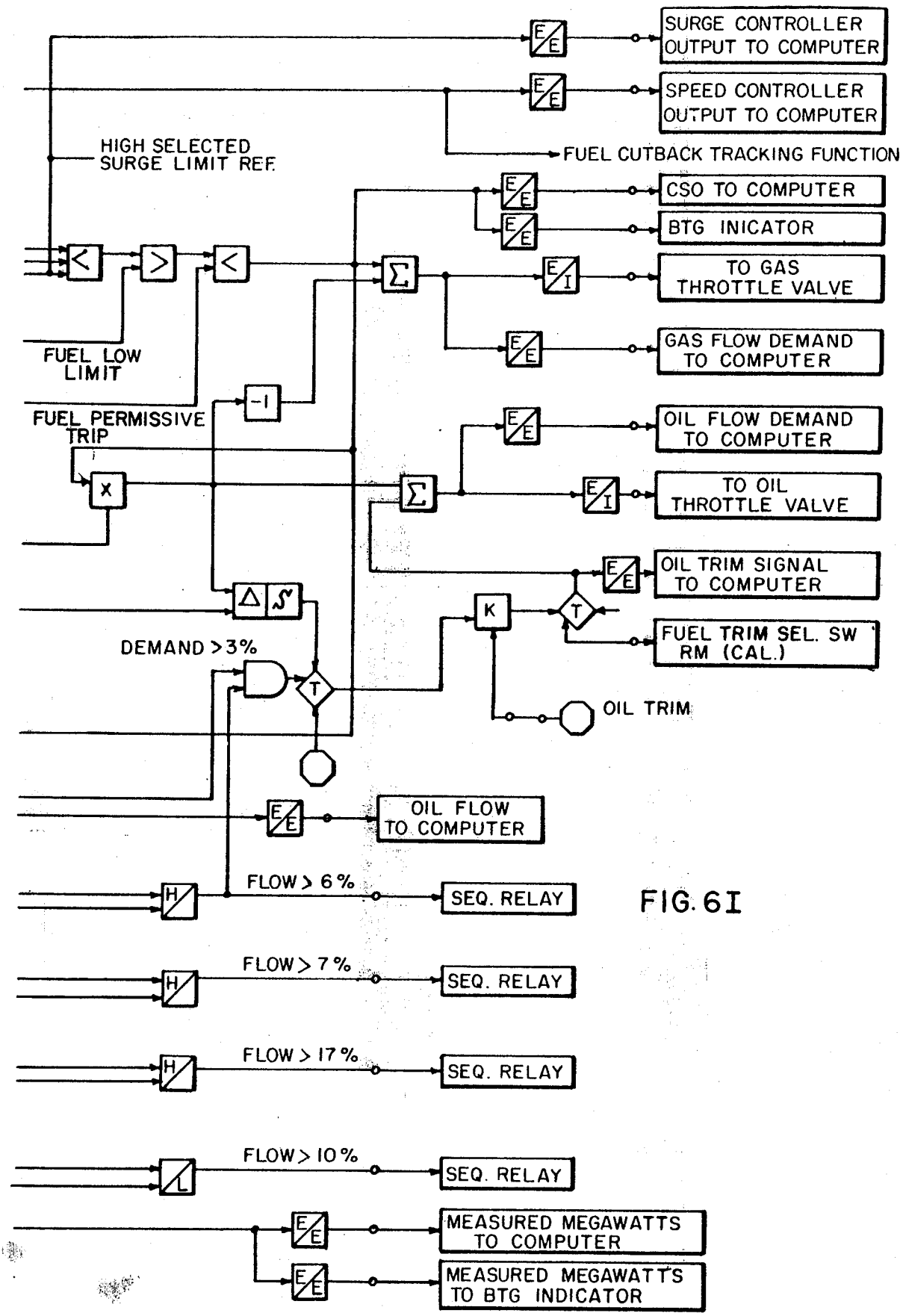

As shown in more detail in FIGS. 6G through 6I, the control system includes an oil/gas fuel transfer system which applies the low selected and high and low limited fuel demand signal to a gas throttle valve position control or an oil throttle valve position control respectively through a summer block 386G or a summer block 388G. The fuel transfer system provides for bumpless changes between oil and gas fuel supply during turbine operation as more fully described in Ser. No. 495,765. The gas throttle valve fuel demand output and the oil throttle valve fuel demand output are respectively applied to conventional electropneumatic positioning controls for the gas and oil throttle valves.

Limit action on the forward speed/load control channel is provided by blade path temperature, overspeed and surge protection systems. As shown in FIGS. 6G–6I, an electrical overspeed protection system 10G includes a proportional controller 226G which compares a turbine speed setpoint of 102 or 106% as indicated by the reference character 228G with a signal representing the sum of the actual speed and, for purposes of quick corrective response to speed errors, the derivative of the actual speed as indicated by the reference character 230G. The proportionality constant of the controller can be varied to vary the regulation from 2% to 8% as indicated in the drawing. The output of the speed controller 226G is checked for high and low limits and applied to a low selector 232G along with the fuel reference from the NHC card 112G as in the reference character 234G and an output from the surge limiter indicated by the reference character 236G. The smallest of the three input signals is selected by the low selector 232G and generated at its output. A high selector 238G prevents the fuel reference from falling below a value required for avoiding outfire, and a low selector 240G prevents the fuel reference from exceeding a predetermined high limit value. The output fuel reference signal is then applied to the fuel transfer control as a position reference for the gas and oil throttle valve controls.

Figure 5A:
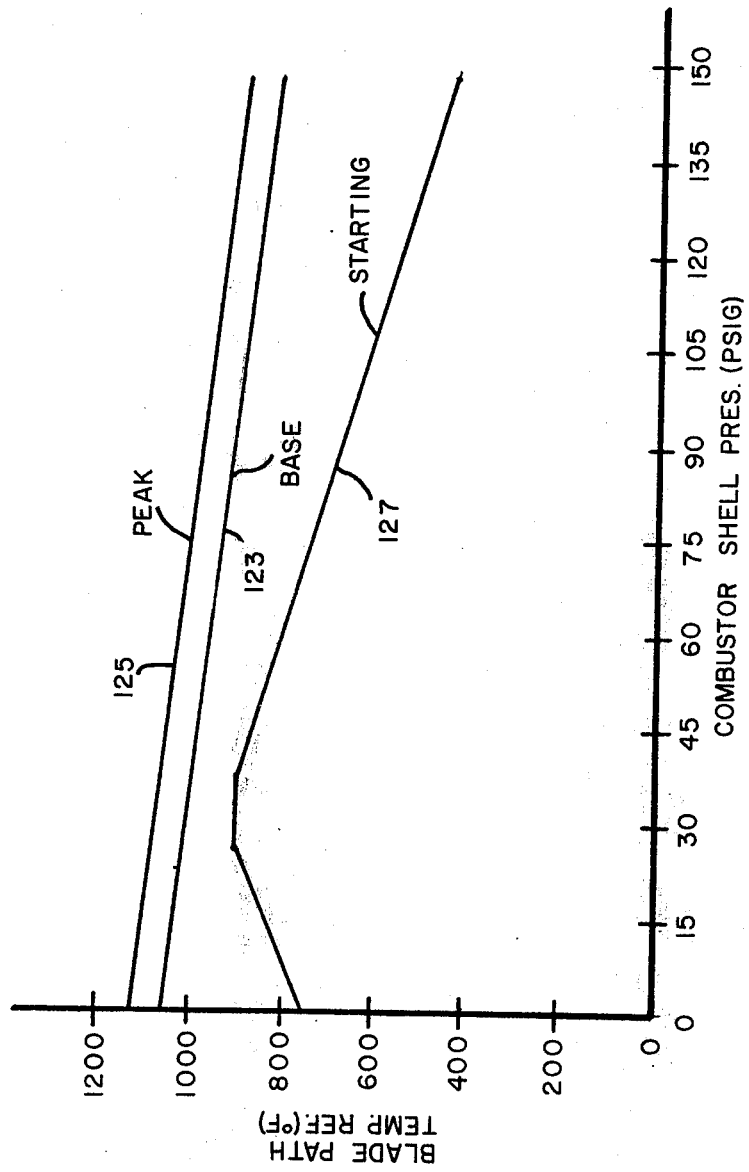
FIG. 5A shows a speed/load characteristic for the gas turbine employed in the combined cycle power plant.
Figure 5B:
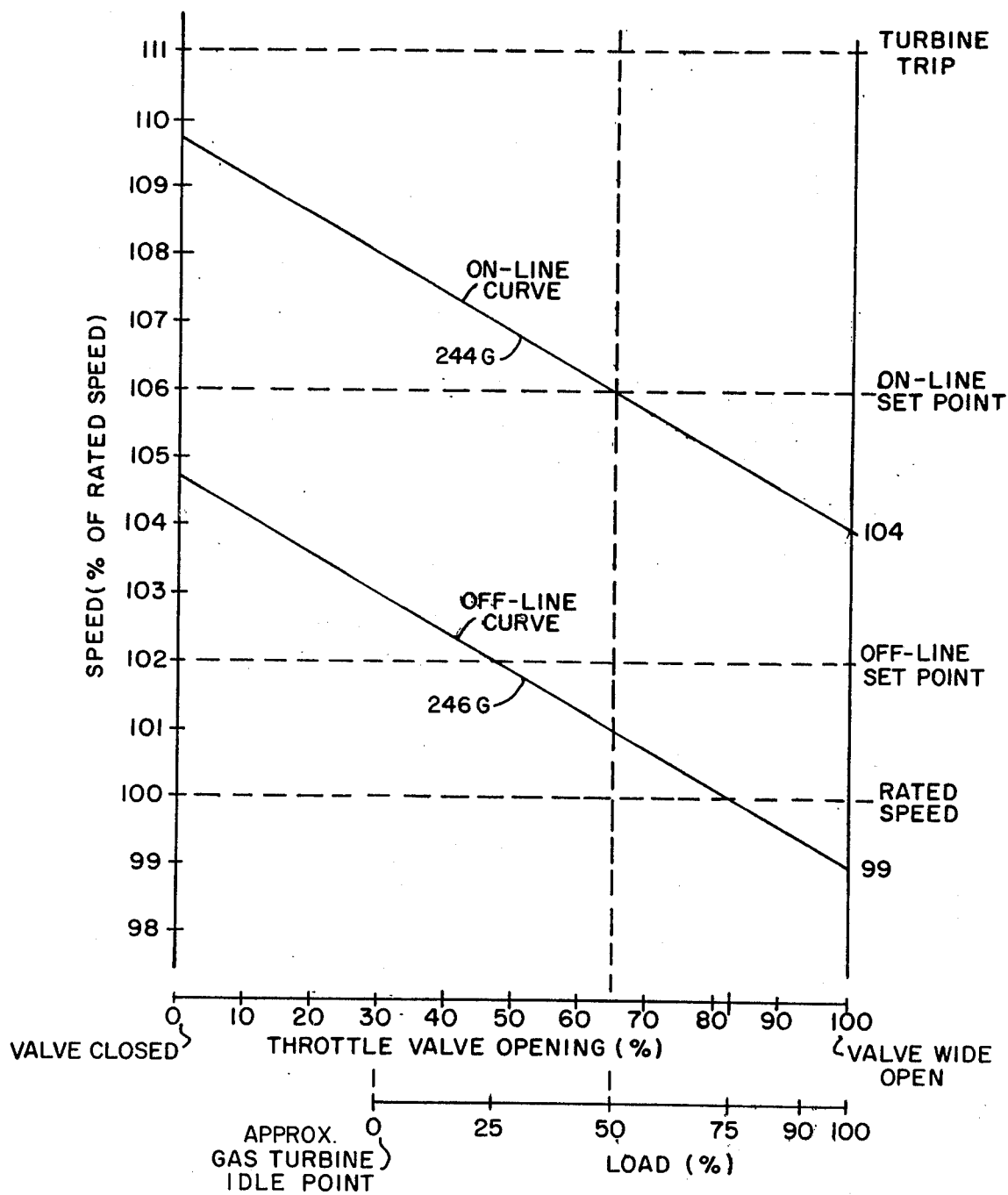
FIG. 5B shows a plot of a blade path temperature limit reference versus combustor shell pressure for three different turbine operating modes.

As illustrated in FIG. 5B, the speed reference is 106% rated speed when the breaker is closed to enable the speed error to be sufficient to allow 100% loading in the load mode. The speed reference is 102% when the breaker is open to allow closer overspeed protection during startup and during idling operation. Upon the opening of the breaker, a switch block 242G switches the speed reference from 106% to 102% to obtain an immediate fuel cutback directly through the speed controller 226G and thereby to reduce the speed bump on a load dump.

In order to track the actual fuel reference signal when the overspeed or surge protection loop becomes active, the NHC fuel reference output is compared with the speed controller output in a high signal monitor 248G (FIG. 6D) and with the high selected surge limit reference in a high monitor 650G (FIG. 6D). If the fuel reference is higher than the speed limit signal, a fuel reference track down signal is generated by an AND block 252G through an OR block 253G and applied to an OR block 227G (FIG. 6A) to set a fast analog fuel lower rate through the NHC clock and to cause a cutback in the NHC fuel reference through the lower OR block 106G. If the fuel reference is higher than the surge limit signal a fuel reference cutback signal is generated through OR block 106G. The fuel reference lower track down signal also operates as a digital or logical trigger for fast clock operation in the NHC card 112G to shorten the time needed to reset the fuel reference.

A track down or cutback signal from the lower OR block 106G causes a cutback or lower demand to be generated by the AND block 108G if the system is in the manual mode. If the system is in the automatic mode, similar tracking occurs through the computer 58G to cause the NHC fuel reference output to track the speed limited fuel reference.

The NOT block 110G processes the track down output of the AND block 108G to generate the lower signal in the NHC card 112G as indicated by the reference character 113G. The output of the AND block 108G is also coupled to display logic to indicate any track down activity. Accordingly, when the electrical overspeed protection loop becomes active to limit the fuel reference applied to the throttle valve control, the output fuel reference from the NHC card 112G is caused to be tracked down to the current value of the speed limited fuel reference. In this manner, a return can be made to automatic or manual NHC card control in a bumpless manner when the overspeed control loop becomes inactive with a drop in turbine speed below the limit value.

In the surge protection system, the combustor shell pressure signal is applied from a sensor 640G (FIG. 6D) to a function generator 642G to generate the higher range surge limit signal for application to a surge high selector 644G (FIG. 6H). A high selector 646G transmits the higher of two feedback speed signals and applies the output to a function generator 648G to generate the lower range surge limit signal for application to the surge high selector 644G (FIG. 6H).

In a temperature limit control subsystem 52G, the combustor shell pressure signal is applied to a function generator 78G to produce a temperature limit signal during startup and it is applied to a proportional function block 80G during load operation. On base load operation, a difference block 82G generates the base load temperature limit signal. On peak load operation, block 84G generates a signal which is added to the base load temperature limit signal by a summing or load function generator block 86G to produce higher temperature limit action during peak operation. Block 88G transmits the applicable limit signal, i.e. the startup or the load temperature limit signal, to the hold and cutback comparators 72G and 74G.

As shown in FIG. 5A, the load temperature limit reference generator 86G generates an output corresponding to a linear characterization 123 for base load generation and a linear characterization 125 for peak load operation. The startup function generator 78G generates a characterization 127 comprising three linear sections having different slopes and approximately a nonlinear function. The basic purpose of the temperature limit control is to protect the gas turbine against excessive turbine inlet temperatures under varying ambient conditions. Since it is difficult to measure turbine inlet temperature, the turbine outlet or blade path temperature is measured and compared to a blade path temperature limit reference obtained from the characterization 123, 125 or 127. In turn, the characterizations 123, 125 and 127 are each calculated from a preselected turbine inlet temperature limit and a known function of turbine temperature drop versus combustor shell pressure. Thus, at any particular pressure, each of the characterizations 123, 125 and 127 defines a blade path temperature limit which implies existence of the preselected turbine inlet temperature limit. In the present case, base load operation is automatically selected on breaker closure, and peak load operation is obtained by operator selection.

A plurality of blade path temperature sensors generate temperature signals which are divided into two groups and respectively averaged. Block 90G selects the higher average temperature signal for use in the temperature limit control loop. Thus, the temperature signal is applied to rate blocks 92G and 94G which generate different rate signals on the basis of different derivative functions. Further, the derivative functions for each rate block 92G or 94G is automatically varied as a function of gas turbine status. Thus, different rates are used in each block for starting as compared to loading. A hold summer 96G adds the temperature signal and the rate signal from the block 92G. A cutback summer 98G adds the temperature signal and the rate signal from the block 94G. The hold derivative function in the block 94G has a somewhat higher derivative value than that associated with the cutback block 92G so that the hold control acts more quickly as the temperature limit is exceeded or as it is being approached at a fast rate. Thus, as the temperature limit is being approached, hold or cutback action occurs according to the approach rate.

In the temperature limit control loop, the combustor shell pressure sensor 68G (FIG. 6D) is coupled to a proportional function generator 80G which is provided with a gain adjuster 75G, and the output of the block 80G is summed with a base load temperature setting signal from block 77G in a summer 82G. In addition, a switch 84G controls the application of an input blade path temperature reference peak bias signal from block 79G to the input of the summer 82G. The combustor shell pressure signal is also applied to the input of the startup function generator 78G and a switch 88G determines whether the startup temperature limit signal from the function generator 78G or the load temperature limit signal from the summer 82G is applied to the comparators 72G and 74G (FIG. 6F).

A pair of averaged blade path temperature signals from blocks 81G and 83G are passed through signal conditioners to the high select block 90G (FIG. 6E). The high temperature signal is then applied to the rate blocks 92G and 94G for development of the hold and cutback signals for comparison to the applicable temperature limit reference. The derivative values in the hold and cutback rate blocks 92G and 94G are different from each other as previously indicated, and further the derivative value in each rate block 92G or 94G is preferably controlled by switches 91G and 93G respectively to be one value under startup conditions and another value under load conditions.

A breaker closure input 95G operates the switches 91G and 93G to determine value operative derivative valu in the blocks 92G and 94G. With breaker closure, the turbine is placed in the load mode of operation and the operative derivative values in the box 92G and 94G are relatively decreased from the operative values for dynamic startup conditions. In this manner, the system is optimized in its response characteristics to the different operating conditions in the starting and load modes.

The temperature limit logic 76G includes an AND block 102G (FIG. 6B) which responds to a hold signal from the comparator 72G through a NOT block 104G when a fuel reference LOWER demand is not operative. A cutback signal from the comparator 74G is passed through the lower OR block 106G (FIG. 6A) to generate a cutback demand from the AND block 108G if the system is in the manual mode. The NOT block 110G processes the output of the AND block 108G to generate the negative LOWER signal applied to the input of the hold AND block 102G. The output of the cutback block 108G is also coupled to display logic, and it is coupled directly to the NHC hybrid interface card 112G (FIG. 6C) as indicated by the reference character 113G. To effect a hold action, the fuel reference raise input to the NHC card 112G from the AND block 213G is negated when a raise request is operative from the operator panel 54G and when a fuel reference hold signal has been generated at the input of the NOT block 104G to make the output of the AND block 102G a logic zero.

Once the gas turbine control is switched or rejected to the backup mode, the temperature limit loop has no effect on the high selected characterized blade path temperature signal is less than the temperature limit reference. When the characterized feedback temperature signal equals or exceeds the reference value, the hold signal or the cutback signal forces a hold or cutback in the manually controlled fuel reference which is applied from the NHC card 112G to the electropneumatic controls 370G for the gas turbine throttle valve.

DIGITAL/ANALOG HYBRID COUPLER (NHC) CARD

Figure 7:
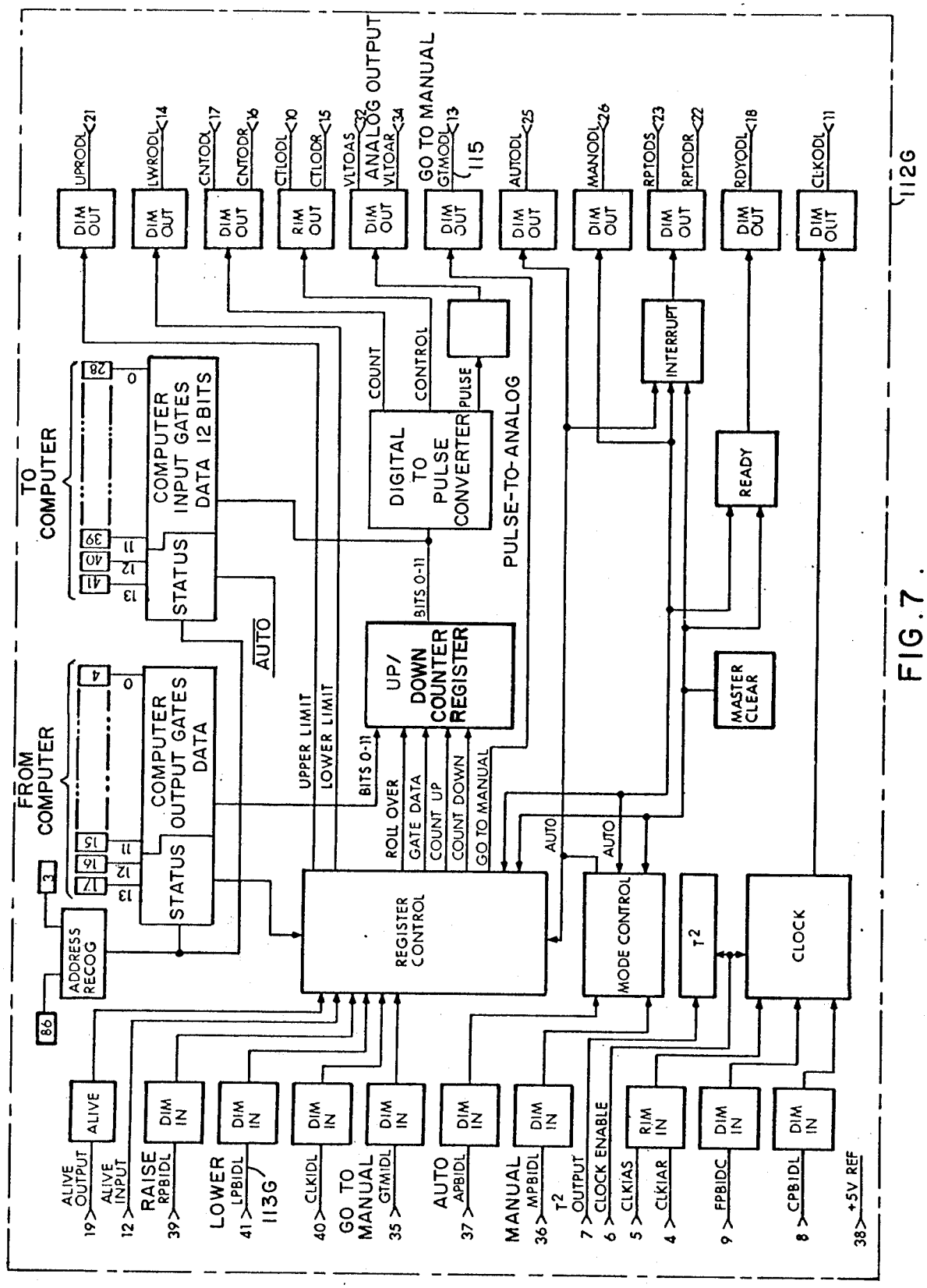
FIG. 7 shows a schematic diagram of a circuit card which provides a hybrid interface between the digital computer circuitry and the analog circuitry employed in the gas turbine control system.

As shown in greater detail in FIG. 7, the fuel reference raise and lower signals are applied to the input of an NHC register control which causes an up/down counter register to count up or count down according to whether a raise demand or lower demand is in effect. On hold operation, an operator raise request is defeated, and on a cutback operation or a track down operation, a fuel reference lower demand is generated at the input of the register control to cause the register to count down. The register output is converted to pulses which in turn are converted to an analog output for application as a fuel reference to the fuel valve control as indicated by the reference character 115G.

An NHC card (FIG. 7) converts a 12 bit binary number from the computer to an analog output signal. This card operates in either the manual or the automatic mode. In the automatic mode, the NHC card output can be set or read by a computer peripheral channel. In the manual mode, the NHC card output is controlled by signals generated outside the computer which raise or lower the output.

In automatic operation, if the computer does not update the NHC card within a set time period, the card is set to the manual mode by an alive circuit. The alive circuit has a timing device which can be set for 1, 5, or 20 seconds. The time period is selectable by resistor and capacitor values.

In manual operation, clock pulses determine the rate of change of the analog output signal. The clock pulses may be generated by either an external or an internal clock.

AUTOMATIC OPERATION

FIG. 7 shows a block diagram for the NHC card. The computer uses a 14 bit word to send and receive data and status. When the address recognition circuit senses that the computer is addressing the NHC card, it gates the data and status bits through the output gates. The status bits are routed to the register control and the data bits are routed to the up/down counter. The status bits are decoded and appropriate action is taken. The output of the up/down counter (which contains the last word from the computer) is converted to a pulse train by the digital/pulse converter. The pulse train is then converted to an analog signal. The output of the up/down counter and the status bits are routed to the input gates and sent to the computer.

MANUAL OPERATION

In the manual mode the count in the up/down counter is regulated by external raise (RPBIDL) and lower (LPBIDL) signals generated either by pushbuttons from a manual/automatic control station or by logic circuitry. The clock will increment or decrement the counter as long as the raise or lower signal is present. Roll over is inhibited; that is, the up/down counter cannot count past 4095 or below 0. The clock rate, which is adjustable by analog control, i.e. by means of a variable voltage at pins 4 and 5, determines the amount of time it takes to change the signal level. When the raise or lower signal goes low, i.e., logical zero, the count in the up/down counter is held; thus, the analog output signal remains constant at that level. The D/A register consists of a set of binary up/down counters which accept parallel data and act as latches in the Automatic mode. In Manual mode the operator (or external logic) has control of the counters and can count them up or down. The raise/lower logic and the clock control this process. The raise and lower inputs control which direction the counters move. The counting rate is determined by the clock. If both raise and lower are enabled simultaneously the counters will do nothing.

MANUAL/AUTO TRANSFER

If forced to Manual mode, the analog output signal remains unchanged at its last value until increased or decreased manually; thus, the transfer is bumpless. The external interrupt alerts the computer to a change in the card's operating mode. It is activated when the card goes from Auto to Manual or from Manual to Auto for any reason. A manual to auto transfer may be initiated only by the operator depressing the "Auto" pushbutton. The card will remain in Manual mode if any internal or external "Go To Manual" signal exists. A Ready output indicates that the card is in Manual mode and that no Go To Manual signal is present. The card can be forced to Manual by a Go To Manual signal. An internal Go To Manual is generated by the computer outputting a Go To Manual status, by either a Raise or Lower input, or by the Keep Alive circuit. After an Auto to Manual transition, the last number set in the D/A register by the computer remains until changed by the operator.

What is claimed is:

1. A combined cycle electric power plant comprising at least one gas turbine, means for generating steam in response to heat energy from said gas turbine, a steam turbine driven by steam supplied to it from said steam generating means, means for generating electric power under the driving power of said turbines, means for controlling the operation of said turbines and said steam generating means, said controlling means including a gas turbine control system having an automatic control and a backup control, means for controlling the flow of fuel to said gas turbine under automatic and backup control, said backup control including a speed/load control for generating a feedforward fuel demand signal for application to said fuel control means during speed and load control substantially free of dependence on speed and load parameter feedback and substantially free of forward controller action, and means for limiting the magnitude of the fuel demand signal for turbine protection purposes.

2. A combined cycle electric power plant as set forth in claim 1 wherein said speed/load control includes means for generating a raise signal and means for generating a lower signal, and a ramp generator is provided for generating the fuel demand signal along an increasing or decreasing ramp in response to the actuation of said raise generating means or said lower generating means.

3. A combined cycle electric power plant as set forth in claim 2 wherein means are provided for generating a first ramp selection signal and means are provided for generating a second ramp selection signal corresponding to fast and normal speed/load change rates, and means are provided for controlling said ramp generator to generate its output in accordance with the first ramp or the second ramp according to whether the first ramp generating means or the second ramp generating means is actuated.

4. A combined cycle electric power plant as set forth in claim 1 wherein said fuel demand limiting means includes a temperature limit control which generates a temperature limit control signal, and means are connected in the control channel between said speed/load control and said fuel control means to limit the output of said speed/load control to the value of the temperature limit control signal when the latter becomes lower than the fuel demand signal based on the speed/load demand.

5. A gas turbine electric power plant comprising a compressor section and a turbine section, a plurality of combustors for energizing the driving gas flow for the turbine section, means for generating electric power under the driving power of the turbine, a gas turbine control system having an automatic control and a backup control, means for controlling the flow of fuel to said gas turbine under automatic and manual control, said backup control including a speed/load control for generating a feedforward fuel demand signal for application to said fuel control means during speed and load control substantially free of dependence on speed and load parameter feedback and substantially free of forward controller action, and means for limiting the magnitude of the fuel demand signal for turbine protection purposes.

6. A gas turbine electric power plant as set forth in claim 5 wherein said speed load control includes means for generating a raise signal and means for generating a lower signal, and a ramp generator is provided for generating the fuel demand signal along an increasing or decreasing ramp in response to the actuation of said raise generating means or said lower generating means.

7. A gas turbine electric power plant as set forth in claim 6 wherein means are provided for generating a first ramp selection signal and means are provided for generating a second ramp selection signal corresponding to fast and normal speed/load change rates, and means are provided for controlling said ramp generator to generate its output in accordance with the first ramp or the second ramp according to whether the first ramp generating means or the second ramp generating means is actuated.

8. A control system for an electric power plant gas turbine comprising an automatic control and a backup control, means for controlling the flow of fuel to said gas turbine under automatic and manual control, said backup control including a speed/load control for generating a feedforward fuel demand signal for application to said fuel control means during speed and load control substantially free of dependence on speed and load parameter feedback and substantially free of forward controller action, and means for limiting the magnitude of the fuel demand signal for turbine protection purposes.

9. A control system as set forth in claim 8 wherein said speed load control includes means for generating a raise signal and means for generating a lower signal, and a ramp generator is provided for generating the fuel demand signal along an increasing or decreasing ramp in response to the actuation of said raise generating means or said lower generating means.

10. A control system as set forth in claim 9 wherein means are provided for generating a first ramp selection signal and means are provided for generating a second ramp selection signal corresponding to fast and normal speed/load change rates, and means are provided for controlling said ramp generator to generate its output in accordance with the first ramp or the second ramp according to whether the first ramp generating means or the second ramp generating means is actuated.

11. A control signal as set forth in claim 8 wherein said fuel demand limiting means includes a temperature limit control which generates a temperature limit control signal, and means are connected in the control channel between said speed/load control and said fuel control means to limit the output of said speed/load control to the value of the temperature limit control signal when the latter becomes lower than the fuel demand signal based on the speed/load demand.

12. A control system as set forth in claim 11 wherein means are provided in the forward control channel to limit the fuel demand signal to predetermined high and low limits.

* * * * *